(12) United States Patent
Matsuoka et al.

(10) Patent No.: US 8,363,040 B2
(45) Date of Patent: Jan. 29, 2013

(54) DISPLAY DEVICE AND ELECTRIC APPARATUS USING THE SAME

(75) Inventors: Toshiki Matsuoka, Osaka (JP); Akio Miyata, Osaka (JP); Tomoko Teranishi, Osaka (JP); Shinichi Nakano, Osaka (JP); Kazuhiro Deguchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 425 days.

(21) Appl. No.: 12/746,100

(22) PCT Filed: Aug. 7, 2008

(86) PCT No.: PCT/JP2008/064208
§ 371 (c)(1),
(2), (4) Date: Jun. 3, 2010

(87) PCT Pub. No.: WO2009/078194
PCT Pub. Date: Jun. 25, 2009

(65) Prior Publication Data
US 2010/0245408 A1    Sep. 30, 2010

(30) Foreign Application Priority Data

Dec. 19, 2007   (JP) ................ 2007-327941

(51) Int. Cl.
*G09G 5/00* (2006.01)
(52) U.S. Cl. .............. 345/206; 345/61; 345/72; 345/88; 345/204; 345/690
(58) Field of Classification Search ............ 345/61, 345/72, 205, 206, 87, 88, 93, 104, 690, 212
See application file for complete search history.

(56) References Cited

U.S. PATENT DOCUMENTS 6,639,580 B1   10/2003   Kishi et al.
(Continued)

FOREIGN PATENT DOCUMENTS

| JP | 2001-201771 A | 7/2001 |
| JP | 2004-252444 A | 9/2004 |

(Continued)

OTHER PUBLICATIONS

European Search Report for corresponding European Application No. 08862007.5, Dec. 3, 2010.
(Continued)

*Primary Examiner* — Quan-Zhen Wang
*Assistant Examiner* — Jennifer Nguyen
(74) *Attorney, Agent, or Firm* — Birch, Stewart, Kolasch & Birch, LLP

(57) ABSTRACT

A display device (10) includes an upper substrate (first substrate) (2), a lower substrate (second substrate) (3), and a conductive liquid (16) that is sealed in a display space (S) formed between the upper substrate (2) and the lower substrate (3) so as to be moved toward an effective display region (P1) or a non-effective display region (P2). In the display device (10), a signal electrode (4), a reference electrode (5), and a scanning electrode (6) are configured so that voltages in a predetermined voltage range can be independently applied to the respective electrodes. The same voltages (third voltage and fourth voltage) are applied to the reference electrode (5) and the scanning electrode (6) that are provided on the lower substrate (3) so as to be located on the effective display region (P1) side and the non-effective display region (P2) side, respectively.

12 Claims, 12 Drawing Sheets

U.S. PATENT DOCUMENTS

| | | | |
|---|---|---|---|
| 7,843,545 B2 * | 11/2010 | Jung et al. | 349/149 |
| 8,259,038 B2 * | 9/2012 | Matsuoka et al. | 345/72 |
| 2001/0030639 A1 | 10/2001 | Goden | |
| 2004/0196525 A1 | 10/2004 | Fujii et al. | |
| 2006/0077330 A1 * | 4/2006 | Ijzerman et al. | 349/143 |
| 2007/0040982 A1 | 2/2007 | Nakano et al. | |
| 2009/0059348 A1 * | 3/2009 | Niwano et al. | 359/296 |
| 2009/0079689 A1 | 3/2009 | Miyata et al. | |

FOREIGN PATENT DOCUMENTS

| | | |
|---|---|---|
| JP | 2006-195190 A | 7/2006 |
| SU | 807375 | 2/1981 |
| WO | WO 2006/129846 A1 | 12/2006 |
| WO | WO 2007/007879 A1 | 1/2007 |
| WO | WO 2007/013682 A1 | 2/2007 |

OTHER PUBLICATIONS

A Decision on Grant for corresponding Russian Patent application No. 2010122738 dated Jan. 19, 2012.

* cited by examiner

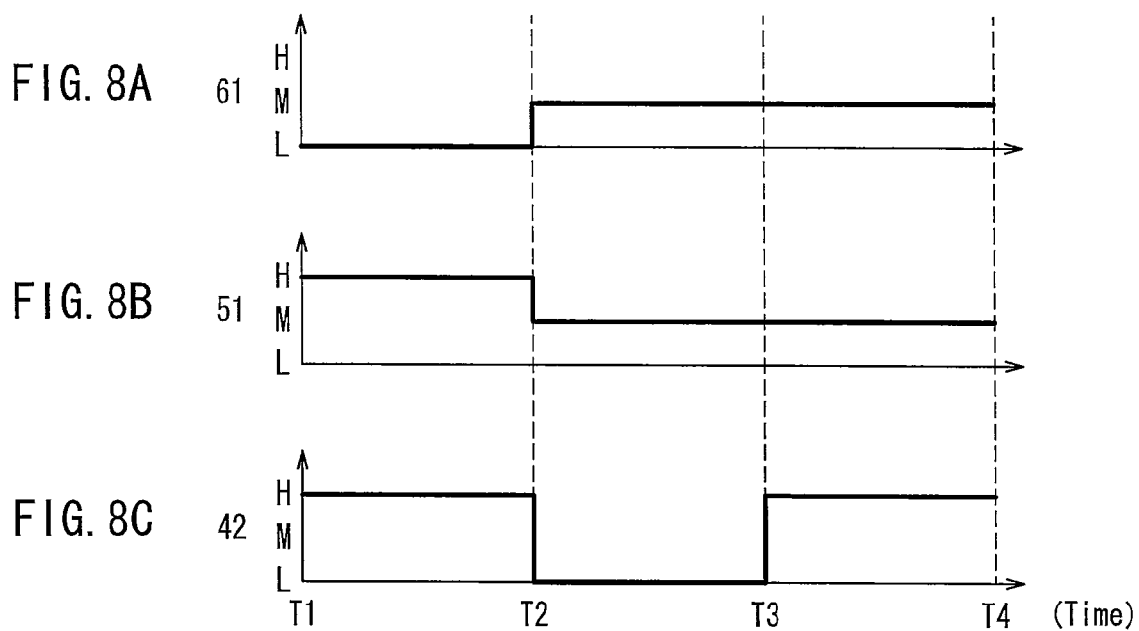

DISPLAY DEVICE AND ELECTRIC APPARATUS USING THE SAME

TECHNICAL FIELD

The present invention relates to a display device that displays information such as images and characters by moving a conductive liquid, and an electric apparatus using the display device.

BACKGROUND ART

In recent years, as typified by an electrowetting type display device, a display device that displays information by utilizing a transfer phenomenon of a conductive liquid due to an external electric field has been developed and put to practical use.

Specifically, such a conventional display device includes first and second electrodes, first and second substrates, and a colored droplet that is sealed in a display space formed between the first substrate and the second substrate and serves as a conductive liquid that is colored a predetermined color (see, e.g., JP 2004-252444 A). In this conventional display device, a voltage is applied to the colored droplet via the first electrode and the second electrode to change the shape of the colored droplet, thereby changing the display color on a display surface.

For the above conventional display device, another configuration also has been proposed, in which the first electrode and the second electrode are arranged side by side on the first substrate and electrically insulated from the colored droplet, and a third electrode is provided on the second substrate so as to face the first electrode and the second electrode. Moreover, a light-shielding shade is provided above the first electrode. Thus, the first electrode side and the second electrode side are defined as a non-effective display region and an effective display region, respectively. With this configuration, a voltage is applied so that a potential difference occurs between the first electrode and the third electrode or between the second electrode and the third electrode. In this case, compared to the way of changing the shape of the colored droplet, the colored droplet can be moved toward the first electrode or the second electrode at a high speed, and thus the display color on the display surface can be changed at a high speed as well.

DISCLOSURE OF INVENTION

Problem to be Solved by the Invention

However, in the above conventional display device, the structure becomes large and complicated when matrix driving is performed.

Specifically, in the conventional display device, a positive potential voltage is applied to one of the first electrode and the second electrode while a negative potential voltage is always applied to the third electrode for each display unit (pixel). Then, the colored droplet is allowed to move toward the first electrode (non-effective display region) or the second electrode (effective display region) at the positive potential. Therefore, when the matrix driving is performed on a plurality of pixels in the conventional display device, the first to third electrodes need to be provided for each of the pixels, making the structure of the display device large and complicated.

The matrix driving can be performed if the conventional display device has a configuration in which a plurality of pixels share each one of the first to third electrodes, and either the positive potential voltage or the negative potential voltage can be applied to the third electrode for each pixel. However, such a configuration causes the conductive liquid to be unstable, and thus may lead to unnecessary displacement of the conductive liquid. This may pose another problem of a decrease in di splay quality of the display device.

With the foregoing in mind, it is an object of the present invention to provide a display device that has excellent display quality and can prevent the structure from being large and complicated even if the matrix driving is performed, and an electric apparatus using the display device.

Means for Solving Problem

To achieve the above object, a display device of the present invention includes the following: a first substrate provided on a display surface side; a second substrate provided on a non-display surface side of the first substrate so that a predetermined display space is formed between the first substrate and the second substrate; an effective display region and a non-effective display region that are defined with respect to the display space; and a conductive liquid sealed in the display space so as to be moved toward the effective display region or the non-effective display region. The display device is capable of changing a display color on the display surface side by moving the conductive liquid. The display device includes the following: a signal electrode that is placed in the display space so as to come into contact with the conductive liquid; a reference electrode that is provided on one of the first substrate and the second substrate so as to be electrically insulated from the conductive liquid and to be located on one of the effective display region side and the non-effective display region side; and a scanning electrode that is provided on one of the first substrate and the second substrate so as to be electrically insulated from the conductive liquid and the reference electrode and to be located on the other of the effective display region side and the non-effective display region side. The signal electrode, the reference electrode, and the scanning electrode are configured so that voltages in a predetermined voltage range between a first voltage and a second voltage can be independently applied to the respective electrodes. A third voltage between the first voltage and the second voltage is applied to the reference electrode and a fourth voltage that is substantially the same as the third voltage is applied to the scanning electrode.

In the above display device, the voltages in the predetermined voltage range between the first voltage and the second voltage can be independently applied to the signal electrode, the reference electrode, and the scanning electrode. With this configuration, unlike the conventional example, the display device can prevent the structure from being large and complicated even if the matrix driving is performed. Moreover, the third voltage is applied to the reference electrode and the fourth voltage is applied to the scanning electrode. Thus, it is possible to suppress unnecessary displacement of the conductive liquid even if the matrix driving is performed. Therefore, the display device can prevent a decrease in display quality due to the displacement of the conductive liquid and have excellent display quality.

In the context of the present invention, the fourth voltage that is substantially the same as the third voltage is defined as follows. When a voltage in the predetermined voltage range between the first voltage and the second voltage is applied to the signal electrode while the third voltage and the fourth voltage are applied to the reference voltage and the scanning voltage, respectively, the fourth voltage can serve to suppress unnecessary displacement of the conductive liquid from its current position without moving the conductive liquid and has a predetermined voltage width with respect to the third voltage.

In the above display device, it is preferable that a plurality of the signal electrodes are provided along a predetermined arrangement direction, and a plurality of the reference electrodes and a plurality of the scanning electrodes are alternately arranged so as to intersect with the plurality of the signal electrodes. It is also preferable that the display device includes the following: a signal voltage application portion that is connected to the plurality of the signal electrodes and applies a signal voltage in the predetermined voltage range between the first voltage and the second voltage to each of the signal electrodes in accordance with information to be displayed on the display surface side; a reference voltage application portion that is connected to the plurality of the reference electrodes and applies one of a selected voltage and a non-selected voltage to each of the reference electrodes, the selected voltage allowing the conductive liquid to move in the display space in accordance with the signal voltage and the non-selected voltage inhibiting a movement of the conductive liquid in the display space; and a scanning voltage application portion that is connected to the plurality of the scanning electrodes and applies one of a selected voltage and a non-selected voltage to each of the scanning electrodes, the selected voltage allowing the conductive liquid to move in the display space in accordance with the signal voltage the non-selected voltage inhibiting a movement of the conductive liquid in the display space.

In this case, a matrix-driven display device with excellent display quality can be easily provided.

In the above display device, a plurality of pixel regions may be provided on the display surface side, the plurality of the pixel regions may be located at each of the intersections of the signal electrodes and the scanning electrodes, and the display space in each of the pixel regions may be partitioned by a partition.

In this case, the display color on the display surface side can be changed for each pixel by moving the conductive liquid in each of the pixels on the display surface side.

In the above display device, the plurality of the pixel regions may be provided in accordance with a plurality of colors that enable full-color display to be shown on the display surface side.

In this case, the color image display can be performed by moving the corresponding conductive liquid properly in each of the pixels.

In the above display device, it is preferable that an insulating fluid that is not mixed with the conductive liquid is movably sealed in the display space.

In this case, the speed of movement of the conductive liquid can be easily improved.

In the above display device, it is preferable that a dielectric layer is formed on the surfaces of the reference electrode and the scanning electrode.

In this case, the dielectric layer ensures that the electric field applied to the conductive liquid is increased, so that the speed of movement of the conductive liquid can be more easily improved.

In the above display device, the first substrate and the second substrate may be made of a transparent sheet material, and a backlight may be provided on the back of the second substrate.

In this case, since the display operation is performed using the illumination light emitted from the backlight, a proper display operation can be performed even with insufficient ambient light or at nighttime. Moreover, this configuration can easily provide a high brightness display device that has a large dimming range and is readily capable of performing a high precision gradation control.

In the display device, the first substrate may be made of a transparent sheet material, and the second substrate may be provided with a light reflection portion.

In this case, since the light reflection portion reflects the externally incident ambient light so as to perform the display operation, this configuration can easily provide a thin electric power-saving display device.

In the above display device, the first substrate may be made of a transparent sheet material, the second substrate may be provided with a light reflection portion and a transparent portion that are arranged side by side, and a backlight may be provided on the back of the light reflection portion and the transparent portion.

In this case, since the display operation is performed using the ambient light reflected by the light reflection portion and the illumination light emitted from the backlight, this configuration can easily provide a high brightness display device that has a large dimming range and is readily capable of performing a high precision gradation control while reducing the power consumption of the backlight.

In the above display device, it is preferable that each of the third voltage and the fourth voltage is an intermediate voltage value between the first voltage and the second voltage.

In this case, the conductive liquid can be more stable and the display quality can be reliably improved.

In the above display device, the non-effective display region may be defined by a light-shielding layer that is provided on one of the first substrate and the second substrate, and the effective display region may be defined by an aperture formed in the light-shielding layer.

In this case, the effective display region and the non-effective display region can be properly and reliably defined with respect to the display space.

An electric apparatus of the present invention includes a display portion that displays information including characters and images. The display portion includes any of the above display devices.

In the electric apparatus having the above configuration, the display portion uses the display device that has excellent display quality and can prevent the structure from being large and complicated even if the matrix driving is performed. Thus, a high-performance electric apparatus that includes the display portion with excellent display quality can be easily provided.

Effects of the Invention

The present invention can provide a display device that has excellent display quality and can prevent the structure from being large and complicated even if the matrix driving is performed, and an electric apparatus using the display device.

BRIEF DESCRIPTION OF DRAWINGS

FIG. 6 is a diagram for explaining a more detailed operation example of the image display apparatus.

FIG. 7 is a diagram for explaining a more detailed operation example of the image display apparatus.

FIG. 8 is a timing chart showing the magnitude of an applied voltage and the application time in the more detailed operation example of the image display apparatus.

FIG. 9 is a diagram for explaining the specific effect of this embodiment.

DESCRIPTION OF THE INVENTION

Figure 1:
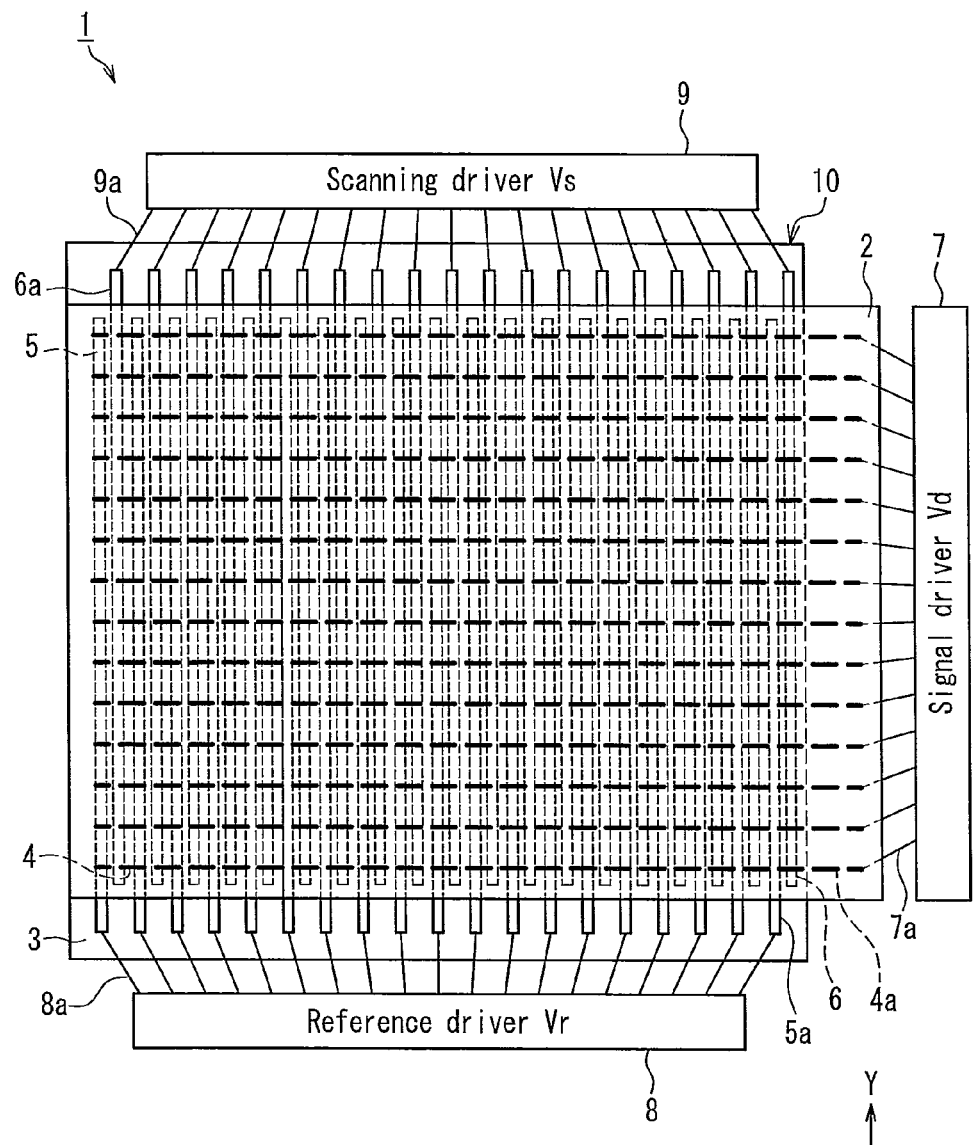
FIG. 1 is plan view for explaining a display device and an image display apparatus of Embodiment 1 of the present invention.

Hereinafter, preferred embodiments of a display device and an electric apparatus of the present invention will be described with reference to the drawings. In the following description, the present invention is applied to an image display apparatus including a display portion that can display color images. The size and size ratio of each of the constituent members in the drawings do not exactly reflect those of the actual constituent members.

[Embodiment 1]

FIG. 1 is a plan view for explaining a display device and an image display apparatus of Embodiment 1 of the present invention. In FIG. 1, an image display apparatus 1 of this embodiment includes a display portion using a display device 10 of the present invention. The display portion has a rectangular display surface. The display device 10 includes an upper substrate 2 and a lower substrate 3 that are arranged to overlap each other in the direction perpendicular to the sheet of FIG. 1. The overlap between the upper substrate 2 and the lower substrate 3 forms an effective display region of the display surface (as will be described in detail later).

In the display device 10, a plurality of signal electrodes 4 are spaced at predetermined intervals and arranged in stripes in the X direction. Moreover, in the display device 10, a plurality of reference electrodes 5 and a plurality of scanning electrodes 6 are alternately arranged in stripes in the Y direction. The signal electrodes 4 intersect with the reference electrodes 5 and the scanning electrodes 6, and a plurality of pixel regions are located at each of the intersections of the signal electrodes 4 and the scanning electrodes 6.

The signal electrodes 4, the reference electrodes 5, and the scanning electrodes 6 are configured so that voltages in the predetermined voltage range between a High voltage (first voltage) and a Low voltage (second voltage) can be independently applied to these electrodes (as will be described in detail later).

In the display device 10, the pixel regions are separated from one another by partitions and provided in accordance with a plurality of colors that enable full-color display to be shown on the display surface, as will be described in detail later. The display device 10 changes the display color on the display surface by moving a conductive liquid (as will be described later) for each of a plurality of pixels (display cells) arranged in a matrix using an electrowetting phenomenon.

One end of the signal electrodes 4, the reference electrodes 5, and the scanning electrodes 6 are extended to the outside of the effective display region of the display surface and form terminals 4a, 5a, and 6a, respectively.

A signal driver 7 is connected to the individual terminals 4a of the signal electrodes 4 via wires 7a. The signal driver 7 constitutes a signal voltage application portion and applies a signal voltage Vd to each of the signal electrodes 4 in accordance with information when the image display apparatus 1 displays the information including characters and images on the display surface.

A reference driver 8 is connected to the individual terminals 5a of the reference electrodes 5 via wires 8a. The reference driver 8 constitutes a reference voltage application portion and applies a reference voltage Vr to each of the reference electrodes 5 when the image display apparatus 1 displays the information including characters and images on the display surface.

A scanning driver 9 is connected to the individual terminals 6a of the scanning electrodes 6 via wires 9a. The scanning driver 9 constitutes a scanning voltage application portion and applies a scanning voltage Vs to each of the scanning electrodes 6 when the image display apparatus 1 displays the information including characters and images on the display surface.

The scanning driver 9 applies either a non-selected voltage or a selected voltage to each of the scanning electrodes 6 as the scanning voltage Vs. The non-selected voltage inhibits the movement of the conductive liquid and the selected voltage allows the conductive liquid to move in accordance with the signal voltage Vd. Moreover, the reference driver 8 is operated with reference to the operation of the scanning driver 9. The reference driver 8 applies either the non-selected voltage that inhibits the movement of the conductive liquid or the selected voltage that allows the conductive liquid to move in accordance with the signal voltage Vd to each of the reference electrodes 5 as the reference voltage Vr.

In the image display apparatus 1, the scanning drive 9 applies the selected voltage to each of the scanning electrodes 6 in sequence, e.g., from the left to the right of FIG. 1, and the reference driver 8 applies the selected voltage to each of the reference electrodes 5 in sequence from the left to the right of FIG. 1 in synchronization with the operation of the scanning driver 9. Thus, the scanning driver 9 and the reference driver 8 perform their respective scanning operations for each line (as will be described in detail later).

The signal driver 7, the reference driver 8, and the scanning driver 9 include a direct-current power supply or an alternating-current power supply that supplies the signal voltage Vd, the reference voltage Vr, and the scanning voltage Vs, respectively.

The reference driver 8 switches the polarity of the reference voltage Vr at predetermined time intervals (e.g., 1 frame). Moreover, the scanning driver 9 switches the polarity of the scanning voltage Vs in accordance with the switching of the polarity of the reference voltage Vr. Thus, since the polarities of the reference voltage Vr and the scanning voltage Vs are switched at predetermined time intervals, the localization of charges in the reference electrodes 5 and the scanning electrodes 6 can be prevented, compared to the case where the voltages with the same polarity are always applied to the reference electrodes 5 and the scanning electrodes 6. Moreover, it is possible to prevent the adverse effects of a display failure (after-image phenomenon) and low reliability (a reduction in life) due to the localization of charges.

The pixel structure of the display device 10 will be described in detail with reference to FIGS. 2 to 4 as well as FIG. 1.

Figure 2:
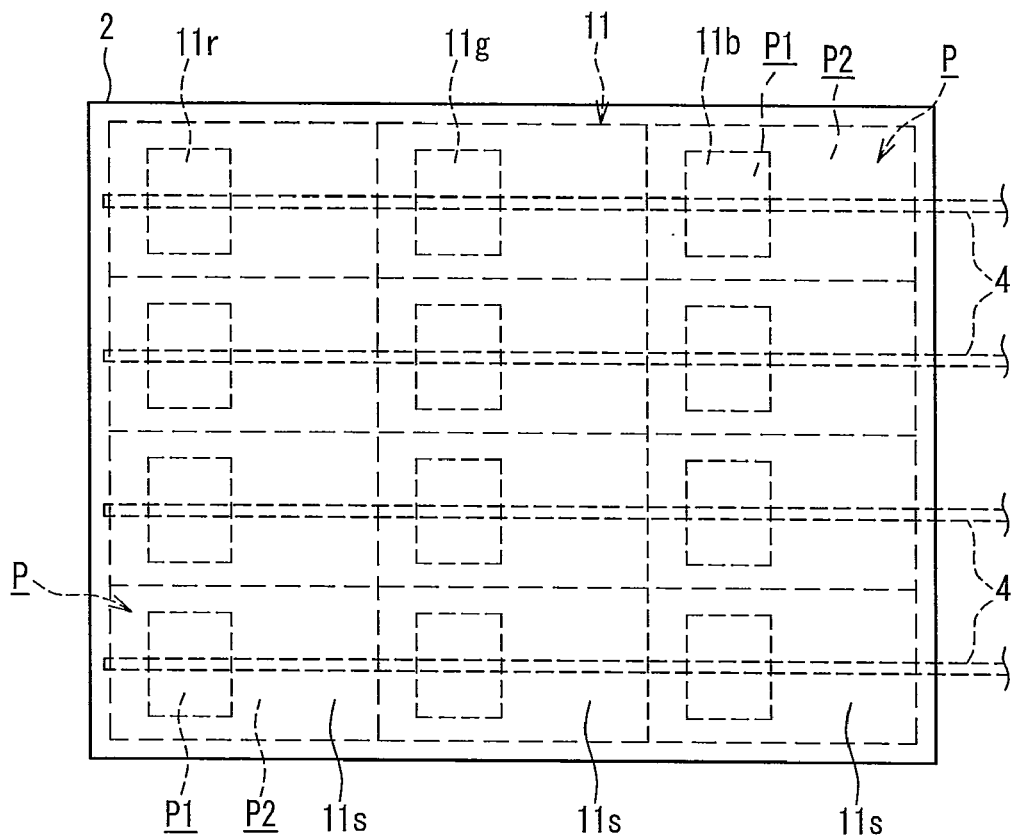
FIG. 2 is an enlarged plan view showing the main configuration of the upper substrate in FIG. 1 when viewed from a display surface side.

FIG. 2 is an enlarged plan view showing the main configuration of the upper substrate in FIG. 1 when viewed from the display surface side. FIG. 3 is an enlarged plan view showing the main configuration of the lower substrate in FIG. 1 when viewed from the non-display surface side. FIGS. 4A and 4B are cross-sectional views showing the main configuration of the display device in FIG. 1 during non-CF color display and CF color display, respectively. For the sake of simplification, FIGS. 2 and 3 show twelve pixels placed at the upper left corner of the plurality of pixels on the display surface in FIG. 1.

Figure 3:
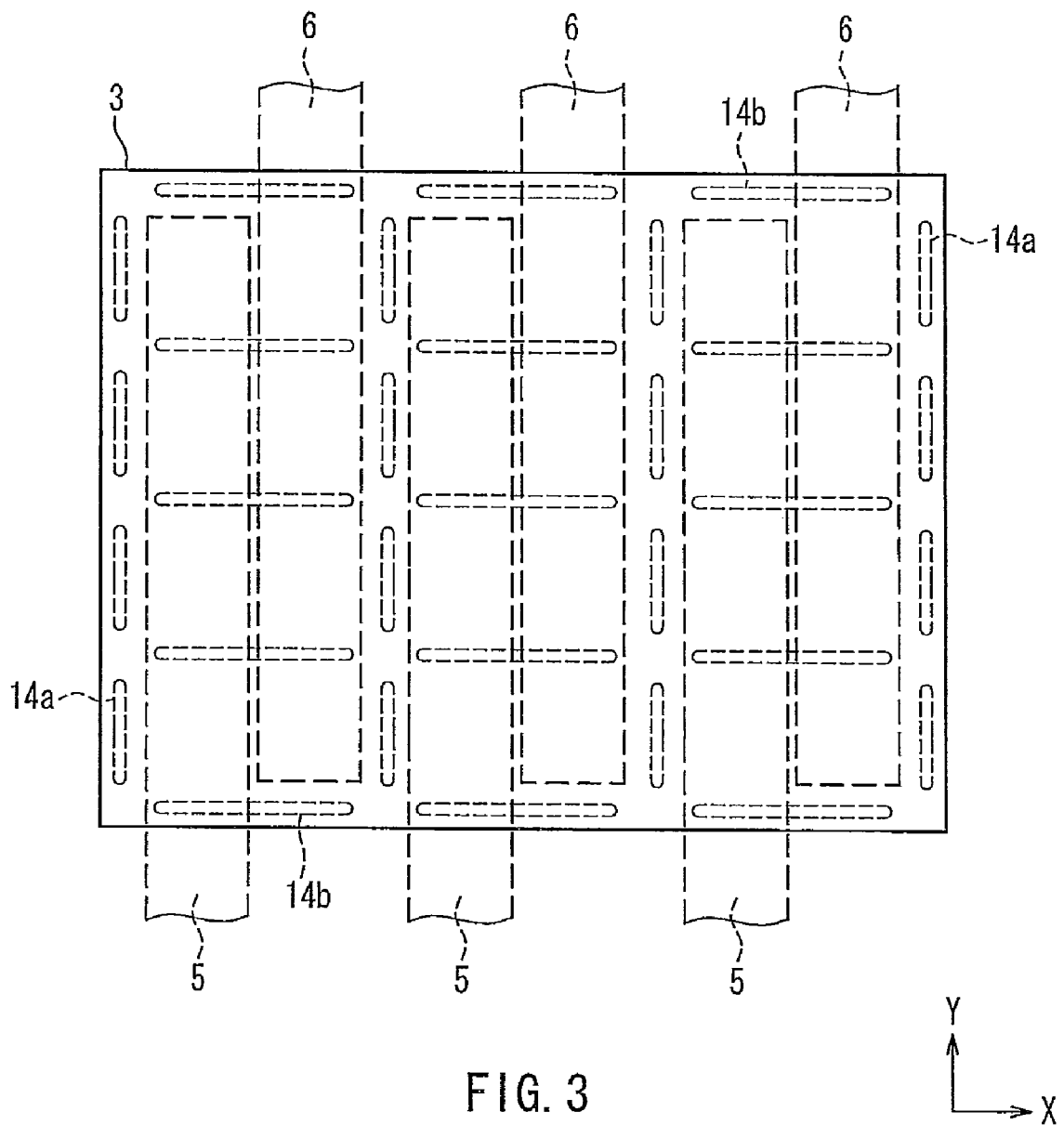
FIG. 3 is an enlarged plan view showing the main configuration of the lower substrate in FIG. 1 when viewed from a non-display surface side.
Figure 4A:
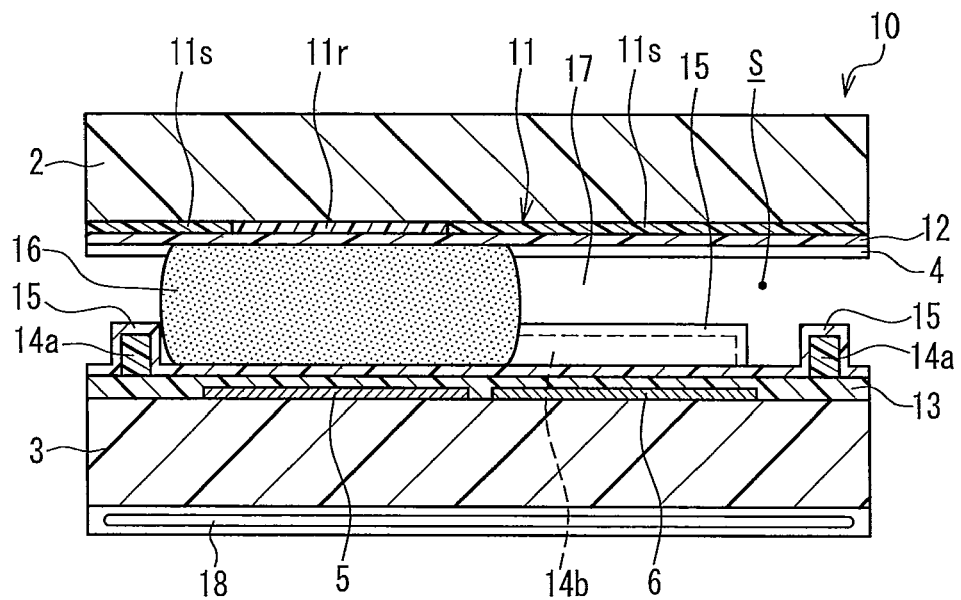
FIGS. 4A and 4B are cross-sectional views showing the main configuration of the display device in FIG. 1 during non-CF color display and CF color display, respectively.
Figure 4B:
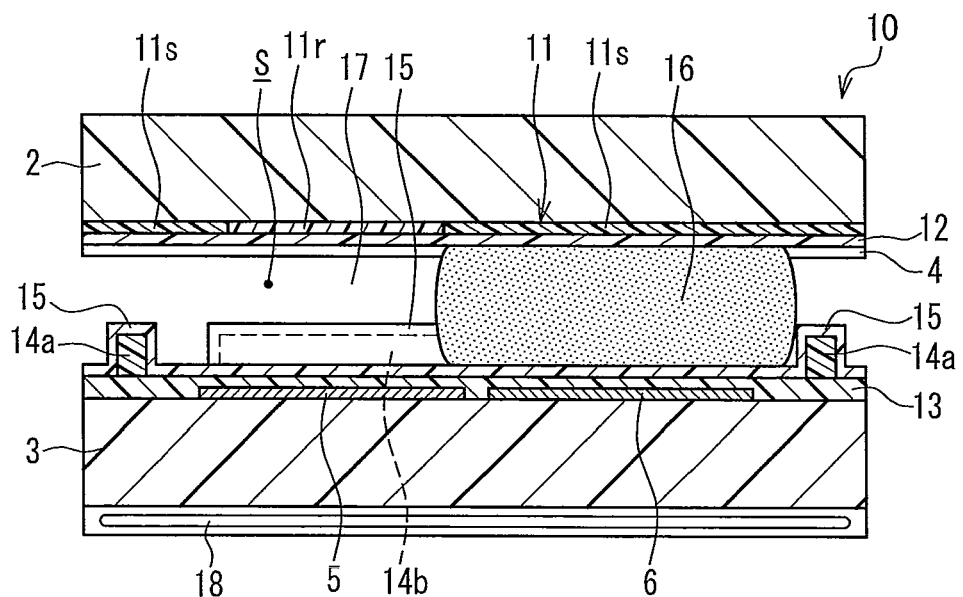

In FIGS. 2 to 4, the display device 10 includes the upper substrate 2 that is provided on the display surface side and serves as a first substrate, and the lower substrate 3 that is provided on the back (i.e., the non-display surface side) of the upper substrate 2 and serves as a second substrate. In the display device 10, the upper substrate 2 and the lower substrate 3 are located at a predetermined distance away from each other, so that a predetermined display space S is formed between the upper substrate 2 and the lower substrate 3. The conductive liquid 16 and an insulating oil 17 that is not mixed with the conductive liquid 16 are sealed in the display space S and can be moved in the X direction (the lateral direction of FIG. 4). The conductive liquid 16 can be moved toward an effective display region P1 or a non-effective display region P2, as will be described later.

The conductive liquid 16 can be, e.g., an aqueous solution including water as a solvent and a predetermined electrolyte as a solute. Specifically, 1 mmol/L of potassium chloride (KCl) aqueous solution may be used as the conductive liquid 16. Moreover, the conductive liquid 16 is colored black with a dye or pigment.

The conductive liquid 16 is colored black and therefore functions as a shutter that allows or prevents light transmission. When the conductive liquid 16 is slidably moved in the display space S toward the reference electrode 5 (i.e., the effective display region P1) or the scanning electrode 6 (i.e., the non-effective display region P2), the display color of each pixel of the display device 10 is changed to black or any color of RBG, as will be described in detail later.

The oil 17 can be, e.g., a nonpolar, colorless, and transparent oil including one or more than one selected from a side-chain higher alcohol, a side-chain higher fatty acid, an alkane hydrocarbon, a silicone oil, and a matching oil. The oil 17 is shifted in the display space S as the conductive liquid 16 is slidably moved.

The upper substrate 2 can be, e.g., a transparent glass material such as a non-alkali glass substrate or a transparent sheet material such as a transparent synthetic resin (e.g., an acrylic resin). A color filter layer 11 and a hydrophobic film 12 are formed in this order on the surface of the upper substrate 2 that faces the non-display surface side. Moreover, the signal electrodes 4 are provided on the hydrophobic film 12.

Like the upper substrate 2, the lower substrate 3 can be, e.g., a transparent glass material such as a non-alkali glass substrate or a transparent sheet material such as a transparent synthetic resin (e.g., an acrylic resin). The reference electrodes 5 and the scanning electrodes 6 are provided on the surface of the lower substrate 3 that faces the display surface side. Moreover, a dielectric layer 13 is formed to cover the reference electrodes 5 and the scanning electrodes 6. Ribs 14a and 14b are formed parallel to the Y direction and the X direction, respectively, on the surface of the dielectric layer 13 that faces the display surface side. In the lower substrate 3, a hydrophobic film 15 is further formed to cover the dielectric layer 13 and the ribs 14a, 14b.

A backlight 18 that emits, e.g., white illumination light is integrally attached to the back (i.e., the non-display surface side) of the lower substrate 3, thus providing a transmission type display device 10.

The color filter layer 11 includes red (R), green (G), and blue (B) color filters 11r, 11g, and 11b and a black matrix 11s serving as a light-shielding layer, thereby constituting the pixels of R, G, and B colors. In the color filter layer 11, as shown in FIG. 2, the R, G, and B color filters 11r, 11g, and 11b are successively arranged in columns in the X direction, and each column includes four color filters in the Y direction. Thus, a total of twelve pixels are arranged in three columns (the X direction) and four rows (the Y direction).

As shown in FIG. 2, in each of the pixel regions P of the display device 10, any of the R, G, and B color filters 11r, 11g, and 11b is provided in a portion corresponding to the effective display region P1 and the black matrix 11s is provided in a portion corresponding to the non-effective display region P2 of the pixel. In other words, with respect to the display space S, the non-effective display region (non-aperture region) P2 is defined by the black matrix (light-shielding layer) 11s and the effective display region P1 is defined by an aperture (i.e., any of the color filters 11r, 11g, and 11b) formed in that black matrix 11s.

In the display device 10, the area of each of the color filters 11r, 11g, and 11b is the same as or slightly larger than that of the effective display region P1. On the other hand, the area of the black matrix 11s the same as or slightly smaller than that of the non-effective display region P2. In FIG. 2, the boundary between two black matrixes 11s corresponding to the adjacent pixels is indicated by a dotted line to clarify the boundary between the adjacent pixels. Actually, however, no boundary is present between the black matrixes 11s of the color filter layer 11.

In the display device 10, the display space S is divided into the pixel regions P by the ribs 14a, 14b serving as the partitions as described above. Specifically, as shown in FIG. 3, the display space S of each pixel is partitioned by two opposing ribs 14a and two opposing ribs 14b. Moreover, in the display device 10, the ribs 14a, 14b prevent the conductive liquid 16 from flowing into the display space S of the adjacent pixel regions P. The ribs 14a, 14b are made of, e.g., a light-curing resin, and the height of the ribs 14a, 14b protruding from the dielectric layer 13 is determined so as to prevent the flow of the conductive liquid 16 between the adjacent pixels.

Other than the above description, e.g., frame-shaped ribs may be formed for each pixel on the lower substrate 3 instead of the ribs 14a, 14b. Moreover, the top of the frame-shaped ribs may be brought into dose contact with the upper substrate 2 so that the adjacent pixel regions P are hermetically separated from one another. When the top of the ribs comes into dose contact with the upper substrate 2, the signal electrodes 4 are provided to penetrate the ribs, and thus can be placed in the display space S.

The hydrophobic films 12, 15 are made of, e.g., a transparent synthetic resin, and preferably a fluoro polymer that functions as a hydrophilic layer for the conductive liquid 16 when a voltage is applied. This can significantly change the wettability (contact angle) between the conductive liquid 16 and each of the surfaces of the upper and lower substrates 2, 3 that face the display space S. Thus, the speed of movement of the conductive liquid 16 can be improved. The dielectric layer 13 can be, e.g., a transparent dielectric film containing parylene, a silicon nitride, a hafnium oxide, a zinc oxide, a titanium dioxide, or an aluminum oxide.

The reference electrodes 5 and the scanning electrodes 6 are made of, e.g., transparent electrode materials such as indium oxides (ITO), tin oxides ($SnO_2$), and zinc oxides (AZO, GZO, or IZO). The reference electrodes 5 and the scanning electrodes 6 are formed in stripes on the lower substrate 3 by a known film forming method such as sputtering.

The signal electrodes 4 can be, e.g., linear wiring that is arranged parallel to the X direction. The signal electrodes 4 are placed on the hydrophobic film 12 so as to extend substantially through the center of each of the pixel regions P in the Y direction, and further to come into direct contact with the conductive liquid 16 by passing through the conductive liquid 16. This can improve the responsibility of the conductive liquid 16 during a display operation.

A transparent hydrophobic film (not shown) made of, e.g., a fluoro polymer is formed on the surfaces of the signal electrodes 4 and allows the conductive liquid 16 to move smoothly. This hydrophobic film does not electrically insulate the signal electrodes 4 from the conductive liquid 16, and therefore not interfere with the improvement in responsibility of the conductive liquid 16.

Other than the above description, the color filter layer 11, the signal electrodes 4, and the hydrophobic film 12 may be formed in this order on the surface of the upper substrate 2 that faces the non-display surface side.

A material that is electrochemically inert to the conductive liquid 16 is used for the signal electrodes 4. Therefore, even if the signal voltage Vd (e.g., 40 V) is applied to the signal electrodes 4, the electrochemical reaction between the signal electrodes 4 and the conductive liquid 16 can be minimized. Thus, it is possible to prevent electrolysis of the signal electrodes 4 and to improve the reliability and life of the display device 10.

Specifically, the signal electrodes 4 are made of, e.g., an electrode material including at least one of gold, silver, copper, platinum, and palladium. The signal electrodes 4 may be formed by fixing thin wires made of the above metal material on the color filter layer 11 or by mounting an ink material such as a conductive paste containing the metal material on the color filter layer 11 with screen printing or the like.

The shape of the signal electrode 4 is determined using the transmittance of the reference electrode 5 located below the effective display region P1 of the pixel. Specifically, based on a transmittance of about 75% to 95% of the reference electrode 5, the shape of the signal electrode 4 is determined so that the occupation area of the signal electrode 4 on the effective display region P1 is 30% or less, preferably 10% or less, and more preferably 5% or less of the area of the effective display region P1.

In each pixel of the display device 10 having the above configuration, as shown in FIG. 4A, when the conductive liquid 16 is held between the color filter 11r and the reference electrode 5, light from the backlight 18 is blocked by the conductive liquid 16, so that the black display (non-CF color display) is performed. On the other hand, as shown in FIG. 4B, when the conductive liquid 16 is held between the black matrix 11s and the scanning electrode 6, light from the backlight 18 is not blocked by the conductive liquid 16 and passes through the color filter 11r, so that the red display (CF color display) is performed.

Hereinafter, a display operation of the image display apparatus 1 of this embodiment having the above configuration will be described in detail with reference to FIGS. 5 to 8 as well as FIGS. 1 to 4.

Figure 5:
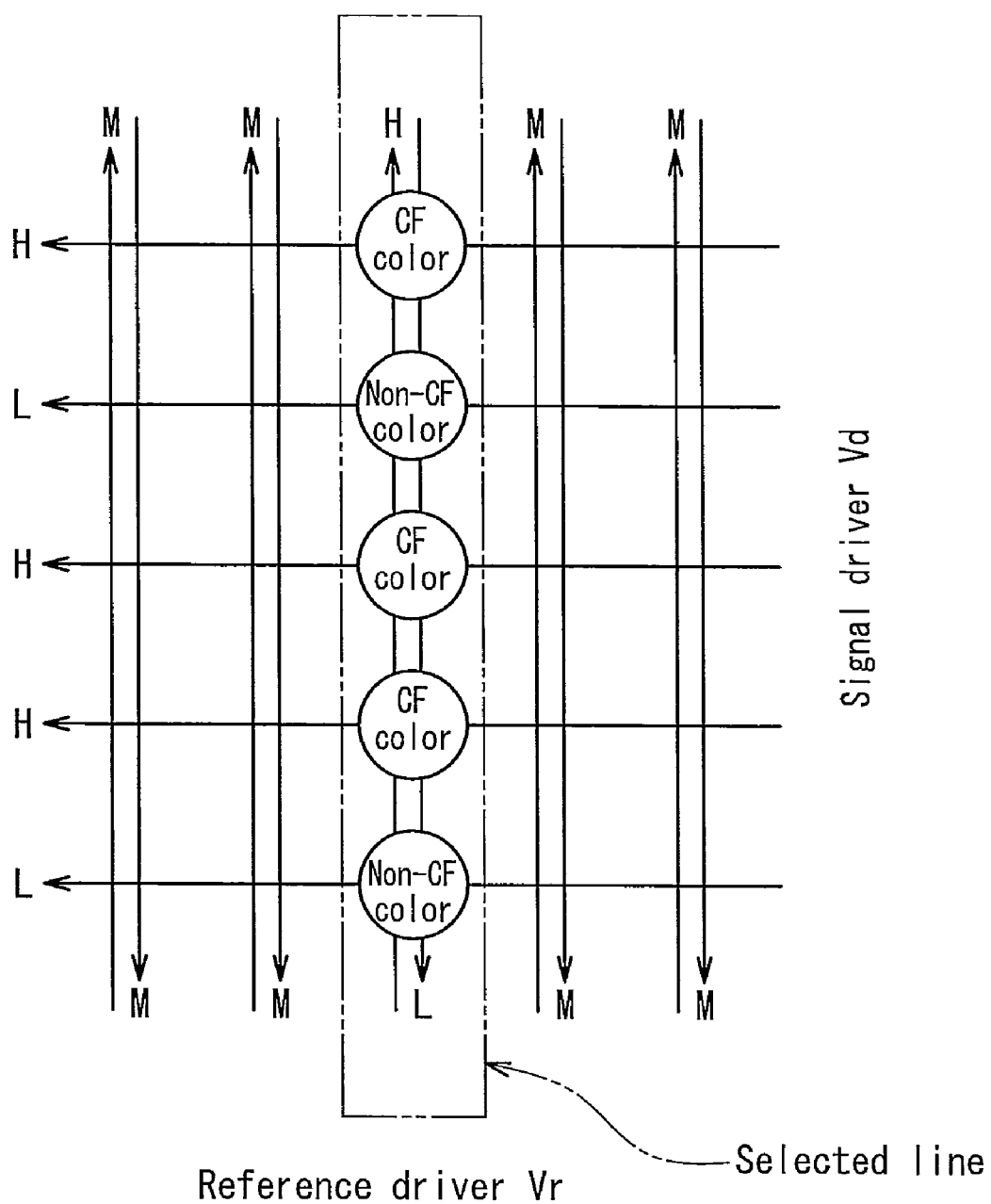
FIG. 5 is a diagram for explaining an operation example of the image display apparatus.

Referring to FIG. 5, first, the basic operation of the image display apparatus 1 will be described.

FIG. 5 is a diagram for explaining an operation example of the image display apparatus 1.

In FIG. 5, the reference driver 8 and the scanning driver 9 apply the selected voltages (i.e., the reference voltage Vr and the scanning voltage Vs) to the reference electrodes 5 and the scanning electrodes 6 in sequence in a predetermined scanning direction, e.g., from the left to the right of FIG. 5, respectively. Specifically, the reference driver 8 and the scanning driver 9 perform their scanning operations to determine a selected line by applying a High voltage (first voltage) and a Low voltage (second voltage) as the selected voltages to the reference electrodes 5 and the scanning electrodes 6 in sequence, respectively. In this selected line, the signal driver 7 applies a High or Low voltage (i.e., the signal voltage Vd) to the corresponding signal electrodes 4 in accordance with the external image input signal. Thus, in each of the pixels of the selected line, the conductive liquid 16 is moved toward the effective display region P1 or the non-effective display region P2, and the display color on the display surface is changed accordingly.

On the other hand, the reference driver 8 and the scanning driver 9 apply the non-selected voltages (i.e., the reference voltage Vr and the scanning voltage Vs) to non-selected lines, namely to all the remaining reference electrodes 5 and scanning electrodes 6, respectively. Specifically, the reference driver 8 and the scanning driver 9 apply Middle voltages (third and fourth voltages), which may be intermediate voltage values between the High voltage and the Low voltage, as the non-selected voltages to all the remaining reference electrodes 5 and scanning electrodes 6, respectively. Thus, in each of the pixels of the non-selected lines, the conductive liquid 16 stands still without unnecessary displacement from the effective display region P1 or the non-effective display region P2, and the display color on the display surface is unchanged.

Table 1 shows the combinations of the voltages applied to the reference electrodes 5, the scanning electrodes 6, and the signal electrodes 4 in the above display operation. As shown in Table 1, the behavior of the conductive liquid 16 and the display color on the display surface depend on the applied voltages. In Table 1, the High voltage, the Low voltage, and the Middle voltage are abbreviated to "H", "L", and "M", respectively (the same is true for Table 2 in the following).

TABLE 1

|  | Reference electrode | Scanning electrode | Signal electrode | Behavior of conductive liquid and display color on display surface |
|---|---|---|---|---|
| Selected line | H | L | H | The conductive liquid is moved toward the scanning electrode. CF color display |
|  |  |  | L | The conductive liquid is moved toward the reference electrode. Black display |
| Non-selected line | M | M | H | The conductive liquid is still (not moving). |
|  |  |  | L | Black or CF color display |

<Selected Line Operation>

In the selected line, e.g., when the High voltage is applied to the signal electrodes 4, there is no potential difference between the reference electrode 5 and the signal electrodes 4 because the High voltage is applied to both of these electrodes. On the other hand, a potential difference between the signal electrodes 4 and the scanning electrode 6 occurs because the Low voltage is applied to the scanning electrode 6. Therefore, the conductive liquid 16 is moved in the display space S toward the scanning electrode 6 that makes a potential difference from the signal electrodes 4. Consequently, the conductive liquid 16 has been moved toward the non-effective display region P2, as shown in FIG. 4B, and allows the illumination light emitted from the backlight 18 to reach the color filter 11r by shifting the oil 17 toward the reference electrode 5. Thus, the display color on the display surface becomes red display (i.e., the CF color display) due to the color filter 11r. In the image display apparatus 1, when the CF color display is performed in all the three adjacent R, G, and B pixels as a result of the movement of the conductive liquid 16 toward the non-effective display region P2, the red, green, and blue colors of light from the corresponding R, G, and B pixels are mixed into white light, resulting in the white display.

In the selected line, when the Low voltage is applied to the signal electrodes 4, a potential difference occurs between the reference electrode 5 and the signal electrodes 4, but not between the signal electrodes 4 and the scanning electrode 6. Therefore, the conductive liquid 16 is moved in the display space S toward the reference electrode 5 that makes a potential difference from the signal electrodes 4. Consequently, the conductive liquid 16 has been moved toward the effective display region P1, as shown in FIG. 4A, and prevents the illumination light emitted from the backlight 18 from reaching the color filter 11r. Thus, the display color on the display surface becomes black display (i.e., the non-CF color display) due to the presence of the conductive liquid 16.

<Non-selected Line Operation>

In the non-selected lines, e.g., when the High voltage is applied to the signal electrodes 4, the conductive liquid 16 stands still in the same position, and the current display color is maintained. Since the Middle voltages are applied to both the reference electrodes 5 and the scanning electrodes 6, the potential difference between the reference electrodes 5 and the signal electrodes 4 is the same as that between the scanning electrodes 6 and the signal electrodes 4. Consequently, the display color is maintained without changing from the black display or the CF color display in the current state.

Similarly, in the non-selected lines, even when the Low voltage is applied to the signal electrodes 4, the conductive liquid 16 stands still in the same position, and the current display color is maintained. Since the Middle voltages are applied to both the reference electrodes 5 and the scanning electrodes 6, the potential difference between the reference electrodes 5 and the signal electrodes 4 is the same as that between the scanning electrodes 6 and the signal electrodes 4.

As described above, in the non-selected lines, the conductive liquid 16 is not moved, but stands still and the display color on the display surface is unchanged regardless of whether the High or Low voltage is applied to the signal electrodes 4.

On the other hand, in the selected line, the conductive liquid 16 can be moved in accordance with the voltage applied to the signal electrodes 4, as described above, and the display color on the display surface can be changed accordingly.

In the image display apparatus 1, depending on the combinations of the applied voltages in Table 1, the display color of each pixel on the selected line can be, e.g., the CF colors (red, green, or blue) produced by the color filters 11r, 11g, and 11b or the non-CF color (black) due to the conductive liquid 16 in accordance with the voltage applied to the signal electrodes 4 corresponding to the individual pixels, as shown in FIG. 5. When the reference driver 8 and the scanning driver 9 determine a selected line of the reference electrode 5 and the scanning electrode 6 by performing their scanning operations, e.g., from the left to the right of FIG. 5, the display colors of the pixels in the display portion of the image display apparatus 1 also are changed in sequence from the left to the right of FIG. 5. Therefore, if the reference driver 8 and the scanning driver 9 perform the scanning operations at a high speed, the display colors of the pixels in the display portion of the image display apparatus 1 also can be changed at a high speed. Moreover, by applying the signal voltage Vd to the signal electrodes 4 in synchronization with the scanning operation for the selected line, the image display apparatus 1 can display various information including dynamic images based on the external image input signal.

The combinations of the voltages applied to the reference electrodes 5, the scanning electrodes 6, and the signal electrodes 4 are not limited to Table 1, and may be as shown in Table 2.

TABLE 2

| | Reference electrode | Scanning electrode | Signal electrode | Behavior of conductive liquid and display color on display surface |
|---|---|---|---|---|
| Selected line | L | H | L | The conductive liquid is moved toward the scanning electrode. CF color display |
| | | | H | The conductive liquid is moved toward the reference electrode. Black display |
| Non-selected line | M | M | H | The conductive liquid is still (not moving). Black or CF color display |
| | | | L | |

The reference driver 8 and the scanning driver 9 perform their scanning operations to determine a selected line by applying the Low voltage (second voltage) and the High voltage (first voltage) as the selected voltages to the reference electrodes 5 and the scanning electrodes 6 in sequence in a predetermined scanning direction, e.g., from the left to the right of FIG. 5, respectively. In this selected line, the signal driver 7 applies the High or Low voltage (i.e., the signal voltage Vd) to the corresponding signal electrodes 4 in accordance with the external image input signal.

On the other hand, the reference driver 8 and the scanning driver 9 apply the Middle voltages as the non-selected voltages to the non-selected lines, namely to all the remaining reference electrodes 5 and scanning electrodes 6.

<Selected Line Operation>

In the selected line, e.g., when the Low voltage is applied to the signal electrodes 4, there is no potential difference between the reference electrode 5 and the signal electrodes 4 because the Low voltage is applied to both of these electrodes. On the other hand, a potential difference between the signal electrodes 4 and the scanning electrode 6 occurs because the High voltage is applied to the scanning electrode 6. Therefore, the conductive liquid 16 is moved in the display space S toward the scanning electrode 6 that makes a potential difference from the signal electrodes 4. Consequently, the conductive liquid 16 has been moved toward the non-effective display region P2, as shown in FIG. 4B, and allows the illumination light emitted from the backlight 18 to reach the color filter 11r by shifting the oil 17 toward the reference electrode 5. Thus, the display color on the display surface becomes red display (i.e., the CF color display) due to the color filter 11r. Like Table 1, when the CF color display is performed in all the three adjacent R, G, and B pixels, the white display is performed.

In the selected line, when the High voltage is applied to the signal electrodes 4, a potential difference occurs between the reference electrode 5 and the signal electrodes 4, but not between the signal electrodes 4 and the scanning electrode 6. Therefore, the conductive liquid 16 is moved in the display space S toward the reference electrode 5 that makes a potential difference from the signal electrodes 4. Consequently, the conductive liquid 16 has been moved toward the effective display region P1, as shown in FIG. 4A, and prevents the illumination light emitted from the backlight 18 from reaching the color filter 11r. Thus, the display color on the display surface becomes black display (i.e., the non-CF color display) due to the presence of the conductive liquid 16.

<Non-selected Line Operation>

In the non-selected lines, e.g., when the Low voltage is applied to the signal electrodes 4, the conductive liquid 16 stands still in the same position, and the current display color is maintained. Since the Middle voltages are applied to both the reference electrodes 5 and the scanning electrodes 6, the potential difference between the reference electrodes 5 and the signal electrodes 4 is the same as that between the scanning electrodes 6 and the signal electrodes 4. Consequently, the display color is maintained without changing from the black display or the CF color display in the current state.

Similarly, in the non-selected lines, even when the High voltage is applied to the signal electrodes 4, the conductive liquid 16 stands still in the same position, and the current display color is maintained. Since the Middle voltages are applied to both the reference electrodes 5 and the scanning electrodes 6, the potential difference between the reference electrodes 5 and the signal electrodes 4 is the same as that between the scanning electrodes 6 and the signal electrodes 4.

In the non-selected lines, as shown in Table 2, similarly to Table 1, the conductive liquid 16 is not moved, but stands still and the display color on the display surface is unchanged regardless of whether the High or Low voltage is applied to the signal electrodes 4.

On the other hand, in the selected line, the conductive liquid 16 can be moved in accordance with the voltage applied to the signal electrodes 4, as described above, and the display color on the display surface can be changed accordingly.

In the image display apparatus 1 of this embodiment, other than the combinations of the applied voltages shown in Tables 1 and 2, the voltage applied to the signal electrodes 4 not only has two values of the High voltage and the Low voltage, but also may be changed between the High voltage and the Low voltage in accordance with information to be displayed on the display surface. That is, the image display apparatus 1 can perform the gradation display by controlling the signal voltage Vd. Thus, the display device 10 can achieve excellent display performance.

Next, the display operation for each line of the image display apparatus 1 of this embodiment will be described in more detail with reference to FIGS. 6 and 7. For the sake of simplification, the following description refers to the arrangement of pixels 3×3) in the X direction and the Y direction.

Figure 6A:
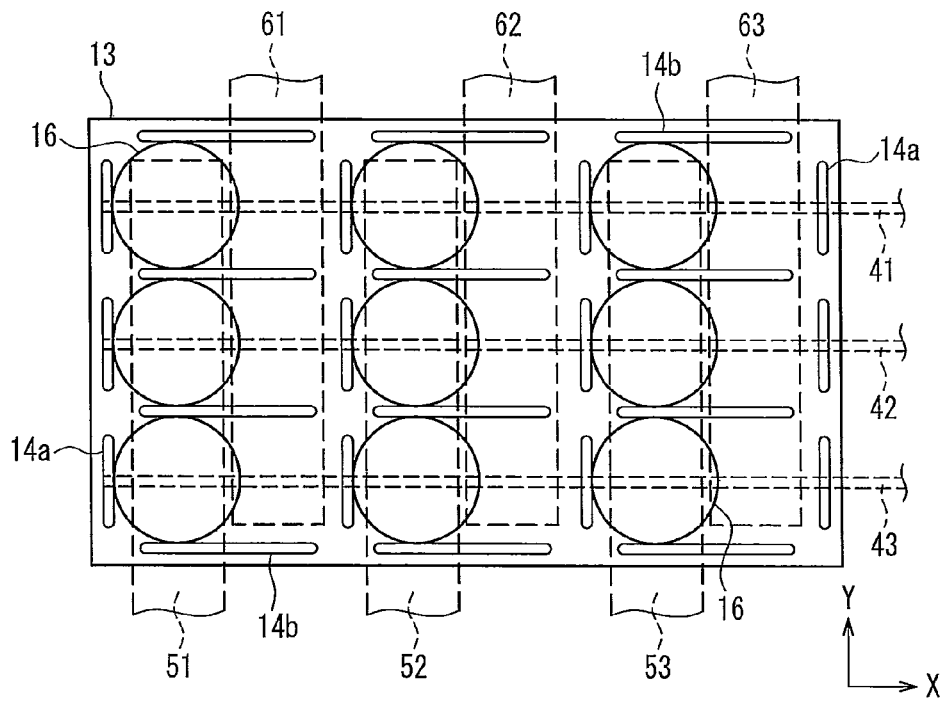
FIGS. 6A and 6B illustrate an initial state and a state of the next stage of the initial state, respectively.
Figure 6B:
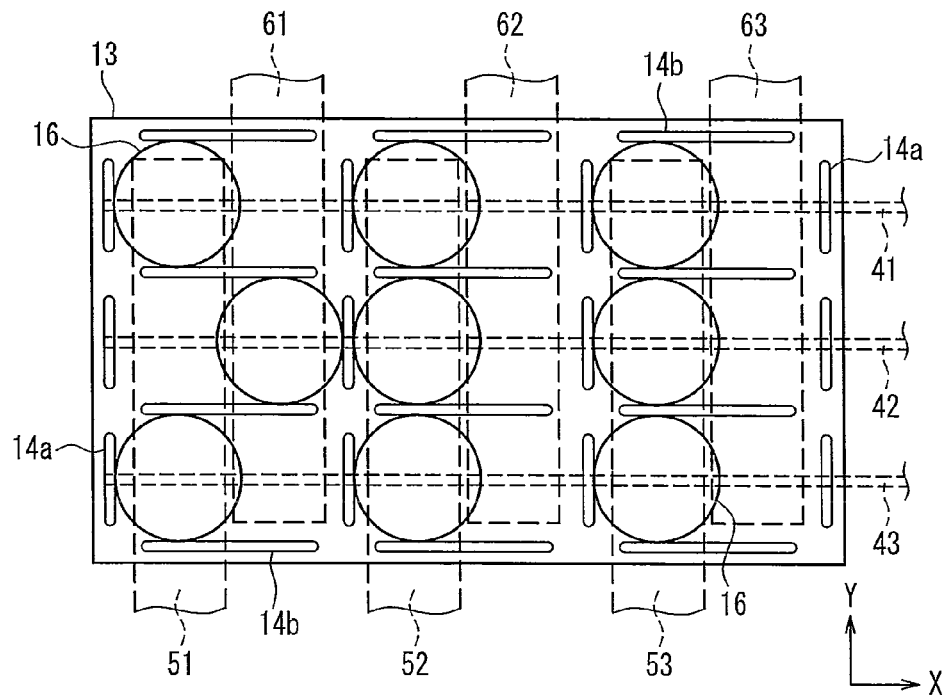
Figure 7A:
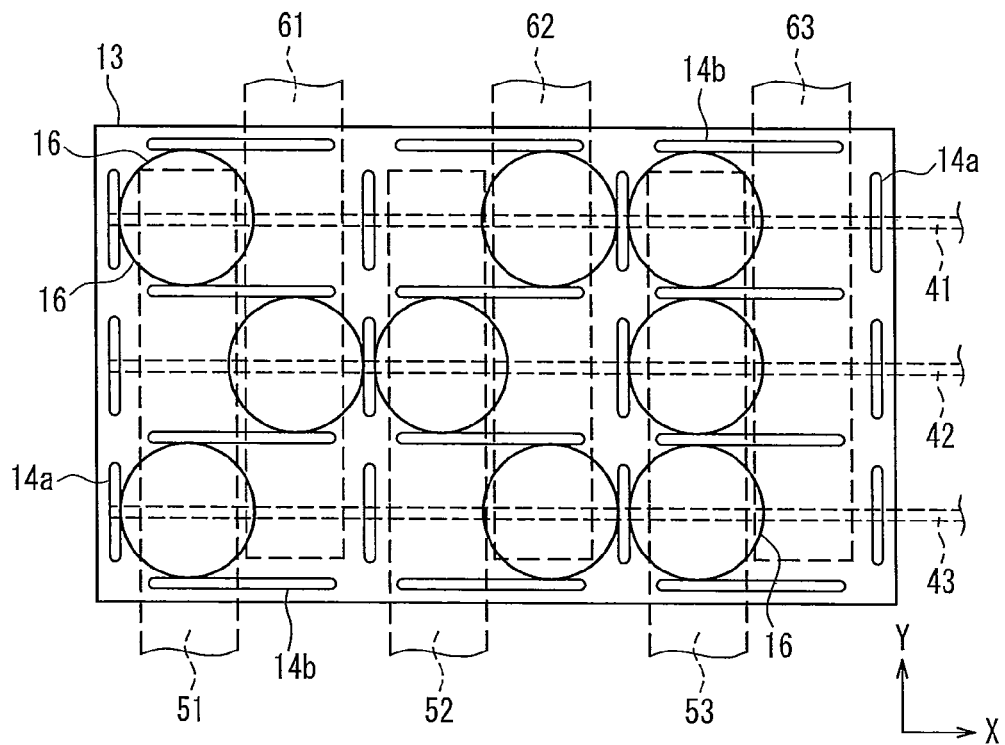
FIGS. 7A and 7B sequentially illustrate states of the subsequent stages to the state shown in FIG. 6B.
Figure 7B:
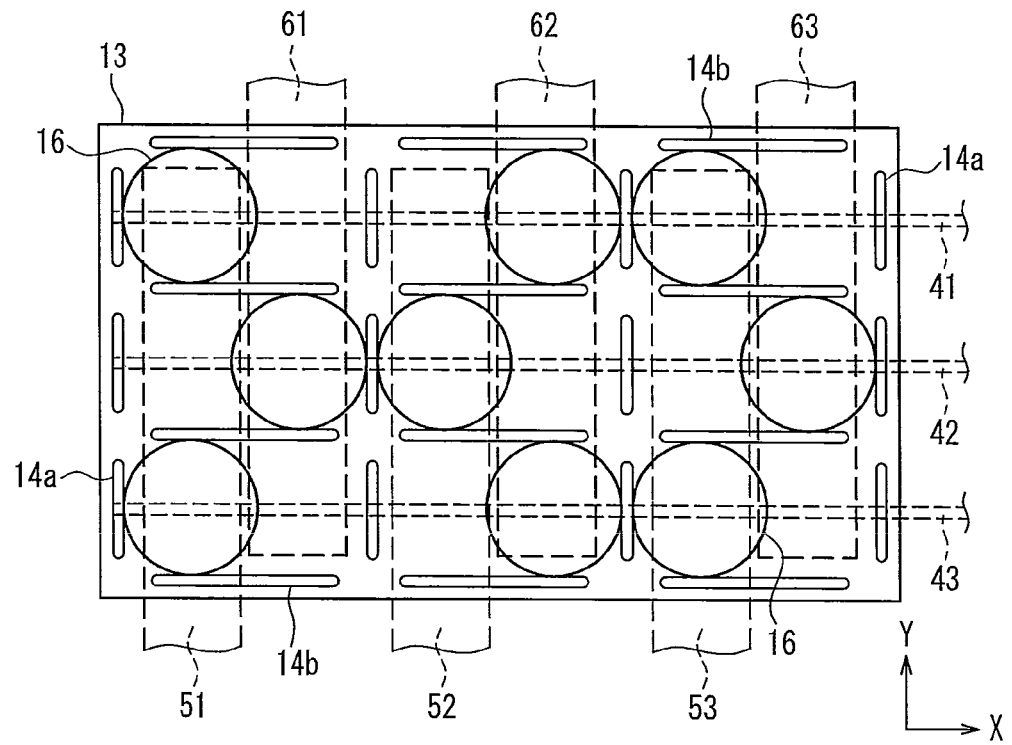

FIG. 6 is a diagram for explaining a more detailed operation example of the image display apparatus. FIGS. 6A and 6B illustrate an initial state and a state subsequent to the initial state, respectively. FIG. 7 is a diagram for explaining a more detailed operation example of the image display apparatus. FIGS. 7A and 7B sequentially illustrate states subsequent to the state shown in FIG. 6B. FIGS. 6 and 7 show the behaviour of the conductive liquid 16 in each pixel when viewed from the upper substrate 2 side, and do not include the oil 17 or the like.

As shown in FIG. 6A, nine pixels are provided in spaces that are located at each of the intersections of the signal electrodes 41, 42, and 43 and a pair of reference and scanning electrodes 51, 61, a pair of reference and scanning electrodes 52, 62, and a pair of reference and scanning electrodes 53, 63. Each of the spaces is surrounded by the ribs 14a, 14b. In the initial state of FIG. 6A, no voltage is applied to the signal electrodes 41 to 43, the reference electrodes 51 to 53, and the scanning electrodes 61 to 63. In the initial state, the conductive liquid 16 is positioned on the effective display region P1 side in each of the pixels, as shown in FIG. 6A.

Next, in FIG. 6B, when the left pixel column is selected as a selected line, the High voltage and the Low voltage are applied to the reference electrode 51 and the scanning electrode 61, respectively. Thus, the conductive liquid 16 is allowed to move. At this time, e.g., if the Low voltage is applied to the signal electrodes 41, 43 and the High voltage is applied to the signal electrode 42, as shown in FIG. 6B, only the conductive liquid 16 of the pixel in the second row is moved toward the scanning electrode 61, i.e., the non-effective display region P2, so that the CF color display is performed. The conductive liquid 16 of the pixels in the first and third rows stays on the reference electrode 51 side, i.e., the effective display region P1 side, so that the non-CF color display is performed.

On the other hand, since the middle and right pixel columns are non-selected lines, the Middle voltages are applied to the reference electrodes 52, 53 and the scanning electrodes 62, 63. Therefore, even if the above voltages are applied to the signal electrodes 41 to 43, the conductive liquid 16 of the corresponding pixels is not moved.

Next, in FIG. 7A, when the middle pixel column is selected as a selected line, the High voltage and the Low voltage are applied to the reference electrode 52 and the scanning electrode 62, respectively. Thus, the conductive liquid 16 is allowed to move. At this time, e.g., if the High voltage is applied to the signal electrodes 41, 43 and the Low voltage is applied to the signal electrode 42, as shown in FIG. 7A, the conductive liquid 16 of the pixels in the first and third rows is moved toward the scanning electrode 62, i.e., the non-effective display region P2, so that the CF color display is performed. The conductive liquid 16 of the pixel in the second row stays on the reference electrode 52 side, i.e., the effective display region P1 side, so that the non-CF color display is performed.

On the other hand, since the left and right pixel columns are non-selected lines, the Middle voltages are applied to the reference electrodes 51, 53 and the scanning electrodes 61, 63. Therefore, even if the above voltages are applied to the signal electrodes 41 to 43, the conductive liquid 16 of the corresponding pixels is not moved.

Next, in FIG. 7B, when the right pixel column is selected as a selected line, the High voltage and the Low voltage are applied to the reference electrode 53 and the scanning electrode 63, respectively. Thus, the conductive liquid 16 is allowed to move. At this time, e.g., if the Low voltage is applied to the signal electrodes 41, 43 and the High voltage is applied to the signal electrode 42, as shown in FIG. 7B, the conductive liquid 16 of the pixel in the second row is moved toward the scanning electrode 63, i.e., the non-effective display region P2, so that the CF color display is performed. The conductive liquid 16 of the pixels in the first and third rows stays on the reference electrode 53 side, i.e., the effective display region P1 side, so that the non-CF color display is performed.

On the other hand, since the left and middle pixel columns are non-selected lines, the Middle voltages are applied to the reference electrodes 51, 52 and the scanning electrodes 61, 62. Therefore, even if the above voltages are applied to the signal electrodes 41 to 43, the conductive liquid 16 of the corresponding pixels is not moved.

Next, the movement of the conductive liquid 16 in any of the pixels will be described in detail with reference to FIG. 8. The following description refers to the pixel in the second row of the left pixel column (referred to as pixel (2, 1) in the following) of the pixels shown in FIGS. 6 and 7.

FIG. 8 is a timing chart showing the magnitude of an applied voltage and the application time in the more detailed operation example of the image display apparatus.

As shown in FIGS. 8A to 8C, when the Low voltage, the High voltage, and the High voltage are applied to the scanning electrode 61, the reference electrode 51, and the signal electrode 42 in the period of time between T1 and T2, respectively, the conductive liquid 16 of the pixel (2, 1) is transferred from the initial state of FIG. 6A to the state of FIG. 6B.

Then, the Middle voltages are applied to the scanning electrode 61 and the reference electrode 51 in the periods of time between T2 and T3 and between T3 and T4. Therefore, the pixel (2, 1) is contained in the non-selected line, which inhibits the movement of the conductive liquid 16. Although the Low voltage and the High voltage are applied to the signal electrode 42 during the periods of time between T2 and T3 and between T3 and T4, respectively, the conductive liquid 16 of the pixel (2, 1) remains in the state of FIG. 6B, and the display color of the pixel (2, 1) is unchanged, as shown in FIGS. 7A and 7B.

The specific voltage values of the High voltage, the Middle voltage, and the Low voltage are, e.g., +8 V, 0 V, and −8 V, respectively. Each of the periods of time between T1 and T2, between T2 and T3, and between T3 and T4 is about 0.5 seconds. The tolerances of the High voltage and the Low voltage are about +30 V and about −30 V, respectively.

In the display device 10 of this embodiment having the above configuration, the voltages in the predetermined voltage range between the High voltage (first voltage) and the Low voltage (second voltage) can be independently applied to the signal electrodes 4, the reference electrodes 5, and the scanning electrodes 6. Thus, unlike the conventional example, the display device 10 can prevent the structure from being large and complicated even if the matrix driving is performed. Moreover, the same Middle voltages (third and fourth voltages) are applied to the reference electrodes 5 and the scanning electrodes 6. Thus, it is possible to suppress unnecessary displacement of the conductive liquid 16 even if the matrix driving is performed. Therefore, the display device 10 can prevent a decrease in display quality due to the displacement of the conductive liquid 16 and have excellent display quality.

Hereinafter, the results of the verification test conducted by the present inventors will be described in detail with reference to FIG. 9.

FIG. 9 is a diagram for explaining the specific effect of this embodiment. FIGS. 9A and 9B are a schematic side view of the display device and a plan view showing a pixel region of the display device, respectively. FIGS. 9C and 9D are a schematic side view of a comparative product and a plan view showing a pixel region of the comparative product.

Figure 9A:
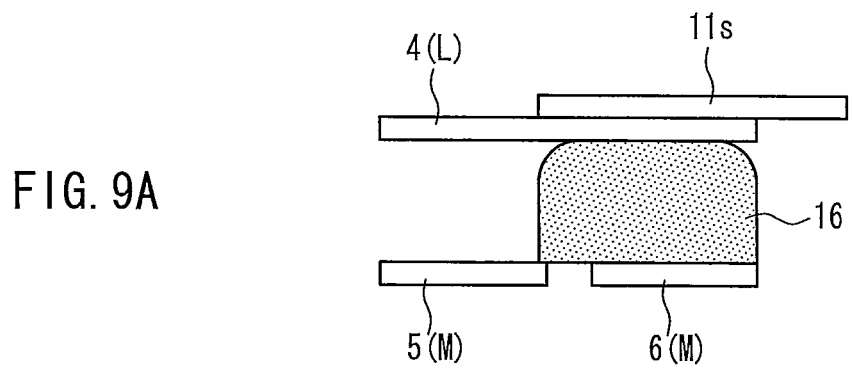
FIGS. 9A and 9B are a schematic side view of the display device and a plan view showing a pixel region of the display device, respectively.

In the verification test, using the display device of this embodiment shown in FIG. 9A and the comparative product shown in FIG. 9C, the behavior of the conductive liquid was confirmed when the voltages were applied in the following manner. Then, while the conductive liquid stayed on the non-effective display region side, the size of the effective display region in which this conductive liquid was not visually observed, i.e., the area of the aperture was compared.

Figure 9B:
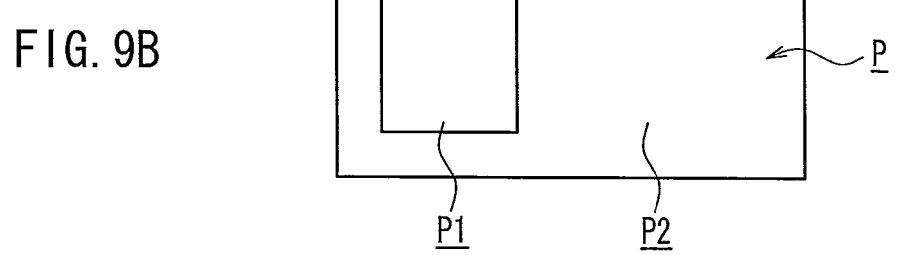
Figure 9C:
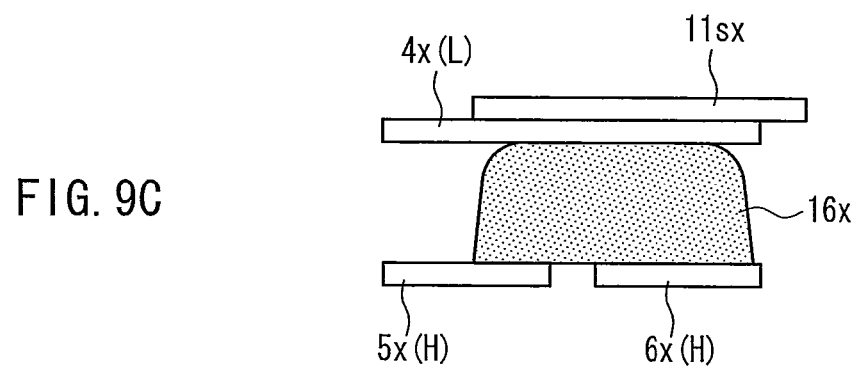
FIGS. 9C and 9D are a schematic side view of a comparative product and a plan view showing a pixel region of the comparative product.
Figure 9D:
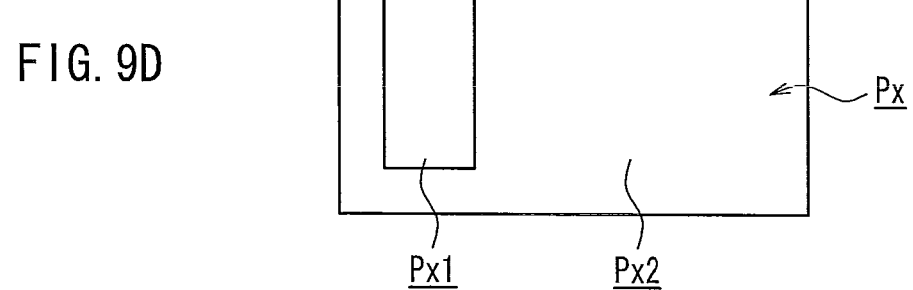

Specifically, FIG. 9B shows the effective display region P1 in the pixel region P of the display device of this embodiment, e.g., when the Low voltage was applied to the signal electrode 4 and the Middle voltage was applied to the reference electrode 5 and the scanning electrode 6. FIG. 9D shows the effective display region Px1 relative to the non-effective display region Px2 in the pixel region Px of the comparative product, e.g., when the Low voltage was applied to the signal electrode 4x and the High voltage was applied to the reference electrode 5x and the scanning electrode 6x. The verification test was conducted by comparing the area of the effective display region P1 (FIG. 9B) with the area of the effective display region Px1 (FIG. 9D).

The results proved that the area of the aperture of the display device of this embodiment was increased by about 25% compared to the comparative product. As shown in FIGS. 9A and 9C, the potential difference between the signal electrode 4 and the reference electrode 5 of the display device of this embodiment was half the potential difference between the signal electrode 4x and the reference electrode 5x of the comparative product. Therefore, compared to the comparative product, the display device of this embodiment was able to improve the wettability of the conductive liquid 16 and to reduce the amount of the conductive liquid 16 spreading in the display space. Consequently, as shown in FIGS. 9A and 9C, the black matrix 11s of the display device of this embodiment was able to be smaller than the black matrix 11sx of the comparative example, and the effective display region P1 was able to be larger.

In the example of FIG. 9A, the Low voltage was applied to the signal electrode 4 and the Middle voltage was applied to the reference electrode 5 and the scanning electrode 6. However, even if the High voltage is applied to the signal electrode 4 and the Middle voltage is applied to the reference electrode 5 and the scanning electrode 6, the potential difference between the signal electrode 4 and the reference electrode 5 of the display device of this embodiment can be half the potential difference between the signal electrode 4x and the reference electrode 5x of the comparative product. In other words, even if the High voltage is applied to the signal electrode 4, unnecessary displacement of the conductive liquid 16 can be suppressed as in the case of applying the Low voltage to the signal electrode 4, thereby increasing the effective display region P1.

In the image display apparatus (electric apparatus) 1 of this embodiment, the display device 10 is used in the display portion. Therefore, it is possible to easily provide the image display apparatus 1 including a display portion with excellent display quality.

In the display device 10 of this embodiment, the plurality of reference electrodes 5 and the plurality of scanning electrodes 6 are alternately arranged on the lower substrate (second substrate) 3 so as to intersect with the plurality of signal electrodes 4. Moreover, in the display device 10 of this embodiment, the signal driver (signal voltage application portion) 7, the reference driver (reference voltage application portion) 8, and the scanning driver (scanning voltage application portion) 9 apply the signal voltage Vd, the reference voltage Vr, and the scanning voltage Vs to the signal electrodes 4, the reference electrodes 5, and the scanning electrodes 6, respectively. Thus, this embodiment can provide the matrix-driven display device 10 with excellent display quality.

In the display device 10 of this embodiment, since the display operation is performed using the illumination light emitted from the backlight 18, a proper display operation can be performed even with insufficient ambient light or at nighttime. Moreover, this embodiment can easily provide a high brightness display device that has a large dimming range and is readily capable of performing a high precision gradation control.

[Embodiment 2]

Figure 10A:
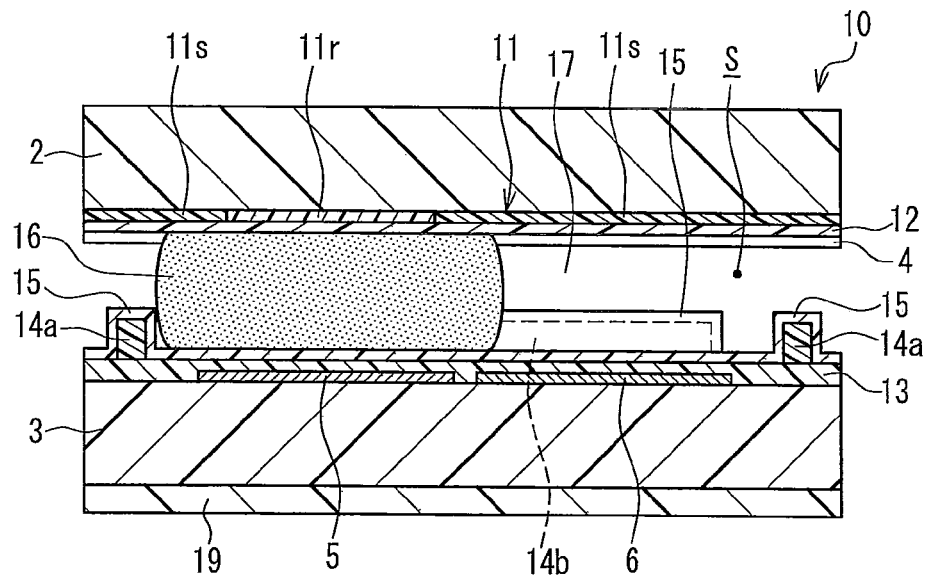
FIGS. 10A and 10B are cross-sectional views showing the main configuration of a display device of Embodiment 2 of the present invention during non-CF color display and CF color display, respectively.
Figure 10B:
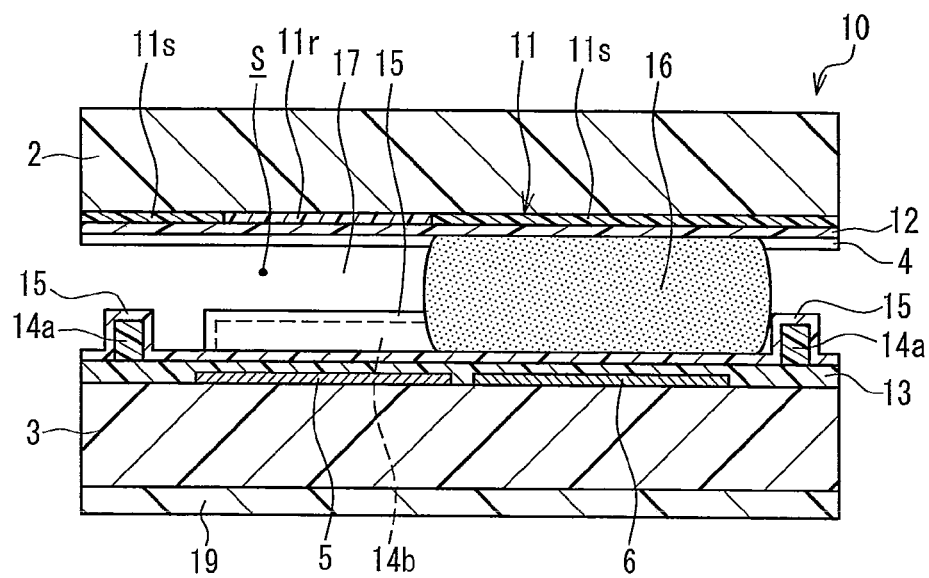

FIGS. 10A and 10B are cross-sectional views showing the main configuration of a display device of Embodiment 2 of the present invention during non-CF color display and CF color display, respectively. In the figures, this embodiment differs from Embodiment 1 mainly in that a reflection type display device is configured by providing a diffuse reflection plate on the back of the lower substrate. The same components as those of Embodiment 1 are denoted by the same reference numerals, and the explanation will not be repeated.

As shown in FIG. 10, in this embodiment, a diffuse reflection plate 19 is integrally provided on the back of the lower substrate 3, and thus a reflection type display device 10 is configured. The diffuse reflection plate 19 includes a transparent resin such as an acrylic resin and a plurality of types of fine particles that are incorporated into the resin and differ from one another in refractive index. The diffuse reflection plate 19 functions as a light reflection portion for reflecting the ambient light that has entered from the upper substrate 2 side (i.e., the display surface side) back to the display surface side. Moreover, as the plurality of types of fine particles, the diffuse reflection plate 19 includes titanium oxide and alumina fine particles having a large refractive index and hollow polymer fine particles having a small refractive index, thereby effectively reflecting the ambient light to the display surface side.

In the display device 10 of this embodiment, as shown in FIG. 10A, when the conductive liquid 16 is held between the color filter 11*r* and the reference electrode 5, the ambient light from the display surface side is blocked by the conductive liquid 16, so that the black display (non-CF color display) is performed. On the other hand, as shown in FIG. 10B, when the conductive liquid 16 is held between the black matrix 11*s* and the scanning electrode 6, the ambient light from the display surface side is not blocked by the conductive liquid 16, reaches the diffuse reflection plate 19, and is reflected back to the display surface side by the diffuse reflection plate 19. Then, the reflected light passes through the color filter 11*r*, so that the red display (CF color display) is performed.

With the above configuration, this embodiment can have effects comparable to those of Embodiment 1. Moreover, since the diffuse reflection plate (light reflection portion) 19 reflects the externally incident ambient light so as to perform the display operation, this embodiment can easily provide a thin electric power-saving display device 10 and the image display apparatus 1.

In the above description, the diffuse reflection plate 19 is provided on the back of the lower substrate 3. However, the present invention is not limited thereto, as long as the light reflection portion is provided on the second substrate that is located on the non-display surface side. For example, when a white plate that is made of a synthetic resin and has a reflection function is used to form the dielectric layer 13, the dielectric layer also can serve as a diffuse reflection plate. Moreover, when such a white plate is used to form the lower substrate 3, the lower substrate also can serve as a diffuse reflection plate.

[Embodiment 3]

Figure 11A:
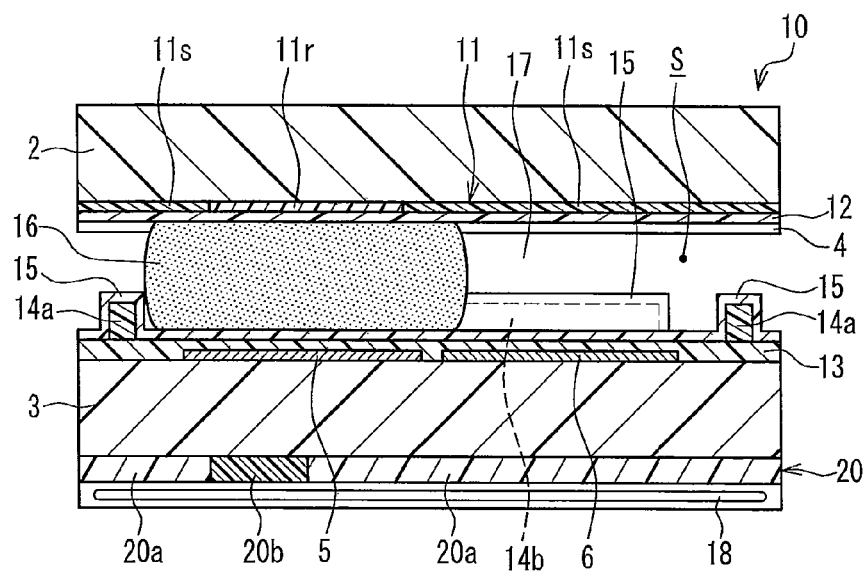
FIGS. 11A and 11B are cross-sectional views showing the main configuration of a display device of Embodiment 3 of the present invention during non-CF color display and CF color display, respectively.
Figure 11B:
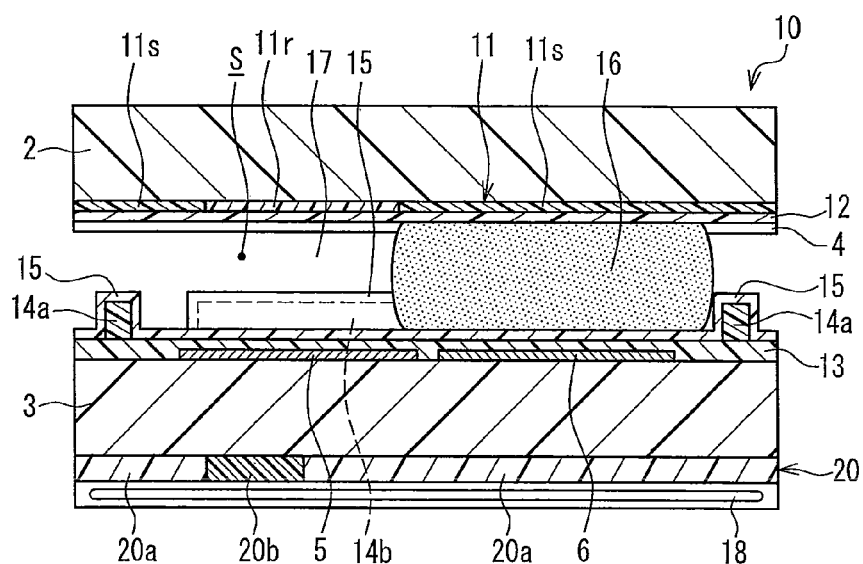

FIGS. 11A and 11B are cross-sectional views showing the main configuration of a display device of Embodiment 3 of the present invention during non-CF color display and CF color display, respectively. In the figures, this embodiment differs from Embodiment 1 mainly in that a semi-transmission type display device is configured by providing a semi-transmission plate on the back of the lower substrate. The semi-transmission plate has a diffuse reflection portion and a transparent portion that are arranged side by side. The same components as those of Embodiment 1 are denoted by the same reference numerals, and the explanation will not be repeated.

As shown in FIG. 11, in this embodiment, a semi-transmission plate 20 is integrally provided on the back of the lower substrate 3, and thus a semi-transmission type display device 10 is configured. The semi-transmission plate 20 has a transparent portion 20*a* and a diffuse reflection portion 20*b* (serving as a light reflection portion) that are arranged side by side in the lateral direction of FIG. 11. Specifically, the transparent portion 20*a* and the diffuse reflection portion 20*b* are provided on the surface of the back of the lower substrate 3 so as to divide the effective display region P1 (FIG. 2) of the pixel into two parts. The transparent portion 20*a* is made of, e.g., a transparent synthetic resin such as an acrylic resin and allows the illumination light from the backlight 18 to pass through it. Like the diffuse reflection plate 19 in FIG. 10, the diffuse reflection portion 20*b* includes a transparent resin containing a plurality of types of fine particles and selves to diffuse and reflect the ambient light that has entered from the display surface side.

In the display device 10 of this embodiment, as shown in FIG. 11A, when the conductive liquid 16 is held between the color filter 11*r* and the reference electrode 5, the ambient light from the display surface side and the illumination light from the backlight 18 are blocked by the conductive liquid 16, so that the black display (non-CF color display) is performed. On the other hand, as shown in FIG. 11B, when the conductive liquid 16 is held between the black matrix 11*s* and the scanning electrode 6, the ambient light from the display surface side is not blocked by the conductive liquid 16, reaches the diffuse reflection portion 20*b*, and is reflected back to the display surface side by the diffuse reflection portion 20*b*. Then, the reflected light passes through the color filter 11*r*. Moreover, the illumination light from the backlight 18 also passes through the color filter 11*r*. Thus, in the display device 10 of this embodiment, the red display (CF color display) is performed with the ambient light and the illumination light.

With the above configuration, this embodiment can have effects comparable to those of Embodiment 1. Moreover, since the display operation is performed using the ambient light reflected by the diffuse reflection portion (light reflection portion) 20*b* and the illumination light emitted from the backlight 18, this embodiment can easily provide a high brightness display device 10 that has a large dimming range and is readily capable of performing a high precision gradation control while reducing the power consumption of the backlight 18, and the image display apparatus 1.

In the above description, the semi-transmission plate 20 having the transparent portion 20*a* and the diffuse reflection portion 20*b* is provided on the back of the lower substrate 3. However, the present invention is not limited thereto, as long as the light reflection portion and the transparent portion are arranged side by side on the second substrate that is located on the non-display surface side. For example, when a white plate that is made of a synthetic resin, provided with a transparent portion, and has a reflection function is used to form the lower substrate 3, the lower substrate also can serve as a semi-transmission plate.

It should be noted that the above embodiments are all illustrative and not restrictive. The technological scope of the present invention is defined by the appended claims, and all changes that come within the range of equivalency of the claims are intended to be embraced therein.

For example, in the above description, the present invention is applied to an image display apparatus including a display portion that can display color images. However, the present invention is not limited thereto, as long as it is applied to an electric apparatus with a display portion that displays the information including characters and images. For example, the present invention is suitable for various electric apparatuses with display portions such as a personal digital assistant such as an electronic organizer, a display apparatus for a personal computer or television, and an electronic paper.

In the above description, the electrowetting-type display device is used, in which the conductive liquid is moved in accordance with the application of an electric field to the conductive liquid. However, the display device of the present invention is not limited thereto, as long as it is an electric-field-induced display device that can change the display color on the display surface by moving the conductive liquid in the display space with the use of an external electric field. For example, the present invention can be applied to other types of electric-field-induced display devices such as an electroosmotic type, an electrophoretic type, and a dielectrophoretic type.

As described in each of the above embodiments, the electrowetting-type display device is preferred because the conductive liquid can be moved at a high speed and a low drive voltage. Moreover, since three different electrodes are used to move the conductive liquid slidably, the electrowetting-type display device can achieve both a high switching speed of the display color on the display surface and electric power saving more easily than the display device in which the shape of the conductive liquid is changed. In the electrowetting-type display device, the display color is changed with the movement of the conductive liquid. Therefore, unlike a liquid crystal display apparatus or the like, there is no viewing angle dependence. Moreover, since a switching device does not need to be provided for each pixel, a high-performance matrix-driven display device having a simple structure can be achieved at a low cost. Further, the electrowetting-type display device does not use a birefringent material such as a liquid crystal layer. Therefore, it is possible to easily provide a high brightness display device with excellent utilization efficiency of light from the backlight or ambient light used for information display.

In the above description, the signal electrodes are provided on the upper substrate (first substrate) and the reference electrodes and the scanning electrodes are provided on the lower substrate (second substrate). However, the present invention is not limited thereto, and may have a configuration in which the voltages in the predetermined voltage range between the first voltage and the second voltage can be independently applied to the signal electrodes, the reference electrodes, and the scanning electrodes, the signal electrodes are placed in the display space so as to come into contact with the conductive liquid, and the reference electrodes and the scanning electrodes are provided on one of the first substrate and the second substrate so as to be electrically insulated from the conductive liquid and each other. Specifically, e.g., the signal electrodes may be provided on the second substrate or on the ribs, and the reference electrodes and the scanning electrodes may be provided on the first substrate.

In the above description, the reference electrodes and the scanning electrodes are located on the effective display region side and the non-effective display region side, respectively. However, the present invention is not limited thereto, and the reference electrodes and the scanning electrodes may be located on the non-effective display region side and the effective display region side, respectively.

In the above description, the reference electrodes and the scanning electrodes are provided on the surface of the lower substrate (second substrate) that faces the display surface side. However, the present invention is not limited thereto, and can use the reference electrodes and the scanning electrodes that are buried in the second substrate made of an insulating material. In this case, the second substrate also can serve as a dielectric layer, which can eliminate the formation of the dielectric layer. Moreover, the signal electrodes may be directly provided on the first and second substrates serving as dielectric layers, and thus may be placed in the display space.

In the above description, the same Middle voltages (third and fourth voltages) are applied to the reference electrodes and the scanning electrodes. However, the present invention is not limited thereto, as long as the third voltage between the first voltage and the second voltage is applied to the reference electrodes, and the fourth voltage that is substantially the same as the third voltage is applied to the scanning electrodes.

As described in each of the above embodiments, the application of the Middle voltage that is an intermediate voltage value between the High voltage (first voltage) and the Low voltage (second voltage) is preferred because the conductive liquid can be more stable and the display quality can be reliably improved.

In the above description, the reference electrodes and the scanning electrodes are made of transparent electrode materials. However, the present invention is not limited thereto, as long as either one of the reference electrodes and the scanning electrodes, which are arranged to face the effective display regions of the pixels, are made of the transparent electrode materials. The other electrodes that do not face the effective display regions can be made of opaque electrode materials such as aluminum, silver, chromium, and other metals.

In the above description, the reference electrodes and the scanning electrodes are in the form of stripes. However, the shapes of the reference electrodes and the scanning electrodes of the present invention are not limited thereto. For example, the reflection type display device may use linear or mesh electrodes that are not likely to cause a light loss, since the utilization efficiency of light used for information display is lower in the reflection type display device than in the transmission type display device.

In the above description, the signal electrodes are linear wiring. However, the signal electrodes of the present invention are not limited thereto, and can be wiring with other shapes such as mesh wiring.

As described in each of the above embodiments, it is preferable that the shape of the signal electrodes is determined using the transmittance of the reference electrodes and the scanning electrodes that are transparent electrodes. This is because even if the signal electrodes are made of an opaque material, shadows of the signal electrodes can be prevented from appearing on the display surface, and thus a decrease in display quality can be suppressed. The use of the linear wiring is more preferred because the decrease in display quality can be reliably suppressed.

In the above description, the conductive liquid is a potassium chloride aqueous solution, and the signal electrodes include at least one of gold, silver, copper, platinum, and palladium. However, the present invention is not limited thereto, as long as a material that is electrochemically inert to the conductive liquid is used for the signal electrodes that are placed in the display space and come into contact with the conductive liquid. Specifically, the conductive liquid can be, e.g., a material including an electrolyte such as a zinc chloride, potassium hydroxide, sodium hydroxide, alkali metal hydroxide, zinc oxide, sodium chloride, lithium salt, phosphoric acid, alkali metal carbonate, or ceramics with oxygen ion conductivity. The solvent can be, e.g., an organic solvent such as alcohol, acetone, formamide, or ethylene glycol other than water. The conductive liquid of the present invention also can be an ionic liquid (room temperature molten salt) including pyridine-, alicyclic amine-, or aliphatic amine-based cations and fluorine anions such as fluoride ions or triflate.

As described in each of the above embodiments, the aqueous solution in which a predetermined electrolyte is dissolved is preferred for the conductive liquid because the display device can have excellent handling properties and also be easily produced.

The signal electrodes of the present invention may be in the passive state including an electrode body composed of a conductive metal such as aluminum, nickel, iron, cobalt, chromium, titanium, tantalum, niobium, or an alloy thereof and an oxide film disposed to cover the surface of the electrode body.

As described in each of the above embodiments, the signal electrodes including at least one of gold, silver, copper, platinum, and palladium are preferred because these metals have a low ionization tendency and make it possible not only to simplify the signal electrodes, but also to reliably prevent an electrochemical reaction between the signal electrodes and the conductive liquid. Thus, the display device can easily prevent a reduction in the reliability and have a long life. Moreover, with the use of the metals having a low ionization tendency, the interfacial tension at the interface between the signal electrodes and the conductive liquid can be relatively small. Therefore, when the conductive liquid is not moved, it can be easily held in a stable state at the fixed position.

In the above description, the nonpolar oil is used. However, the present invention is not limited thereto. For example, air may be used instead of the oil, as long as it is an insulating fluid that is not mixed with the conductive liquid. Moreover, silicone oil or an aliphatic hydrocarbon also can be used as the oil.

As described in each of the above embodiments, the nonpolar oil that is not compatible with the conductive liquid is preferred because the droplets of the conductive liquid move more easily in the nonpolar oil compared to the use of air and the conductive liquid. Consequently, the conductive liquid can be moved at a high speed, and the display color can be switched at a high speed.

In the above description, the black colored conductive liquid and the color filter layer are used to form the pixels of R, G, and B colors on the display surface side. However, the present invention is not limited thereto, as long as a plurality of pixel regions are provided in accordance with a plurality of colors that enable full-color display to be shown on the display surface. Specifically, the conductive liquids with different colors such as RGB, CMY composed of cyan (C), magenta (M), and yellow (Y), or RGBYC also can be used.

Figure 12A:
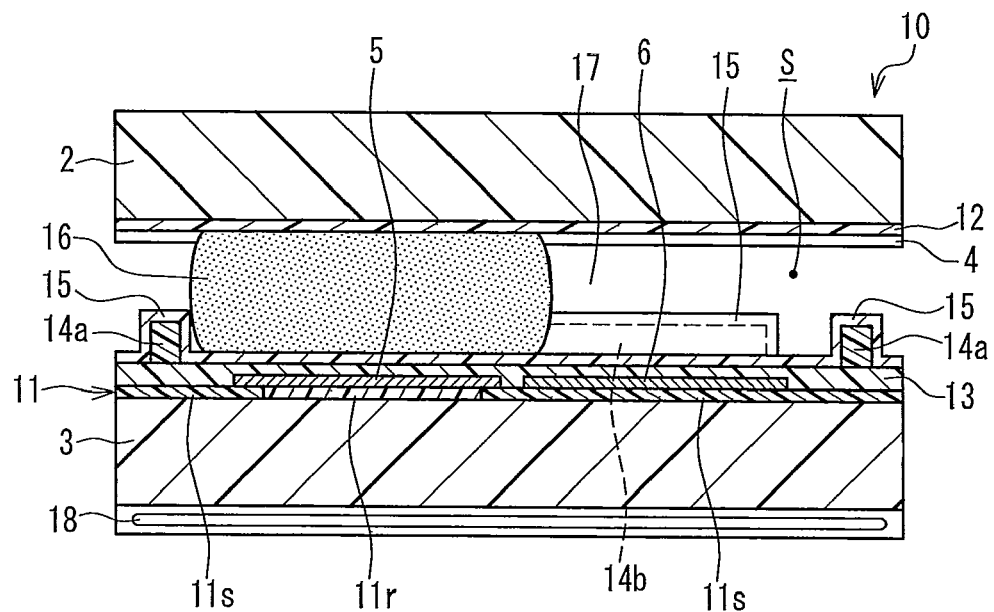
FIGS. 12A and 12B are cross-sectional views showing the main configuration of a modified example of the display device in FIG. 1 during non-CF color display and CF color display, respectively.
Figure 12B:
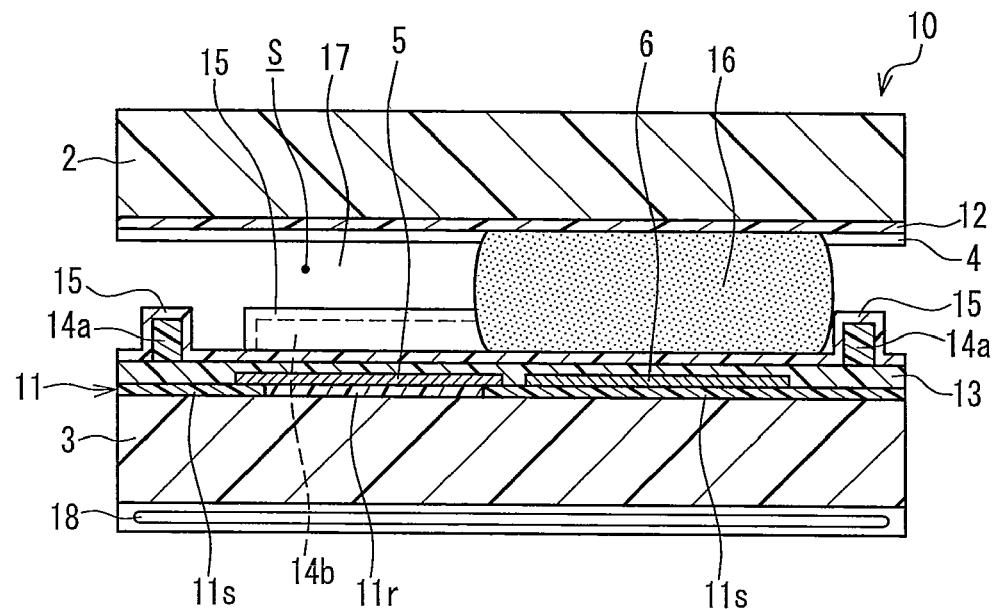

In the above description, the color filter layer is formed on the surface of the upper substrate (first substrate) that faces the non-display surface side. However, the present invention is not limited thereto, and the color filter layer may be formed on the surface of the first substrate that faces the display surface side or on the lower substrate (second substrate). Specifically, as shown in FIGS. 12A and 12B, the color filter layer 11 may be formed on the surface of the lower substrate (second substrate) 3 that faces the display surface side. Thus, the color filter layer is preferred compared to the use of the conductive liquids with different colors because the display device can be easily produced. Moreover, the color filter layer is also preferred because the effective display region and the non-effective display region can be properly and reliably defined with respect to the display space by the color filter (aperture) and the black matrix (light-shielding layer) included in the color filter layer, respectively.

Industrial Applicability

The present invention is useful for a display device that has excellent display quality and can prevent the structure from being large and complicated even if the matrix driving is performed, and a high-performance electric apparatus using the display device.

The invention claimed is:

1. A display device that comprises a first substrate provided on a display surface side, a second substrate provided on a non-display surface side of the first substrate so that a predetermined display space is formed between the first substrate and the second substrate, an effective display region and a non-effective display region that are defined with respect to the display space, and a conductive liquid sealed in the display space so as to be moved toward the effective display region or the non-effective display region, and that is capable of changing a display color on the display surface side by moving the conductive liquid, wherein the display device comprises:

a signal electrode that is placed in the display space so as to come into contact with the conductive liquid;

a reference electrode that is provided on one of the first substrate and the second substrate so as to be electrically insulated from the conductive liquid and to be located on one of the effective display region side and the non-effective display region side; and a scanning electrode that is provided on one of the first substrate and the second substrate so as to be electrically insulated from the conductive liquid and the reference electrode and to be located on the other of the effective display region side and the non-effective display region side, and wherein the signal electrode, the reference electrode, and the scanning electrode are configured so that voltages in a predetermined voltage range between a first voltage and a second voltage can be independently applied to the respective electrodes, and a third voltage between the first voltage and the second voltage is applied to the reference electrode and a fourth voltage that is substantially the same as the third voltage is applied to the scanning electrode.

2. The display device according to claim 1, wherein a plurality of the signal electrodes are provided along a predetermined arrangement direction, and a plurality of the reference electrodes and a plurality of the scanning electrodes are alternately arranged so as to intersect with the plurality of the signal electrodes, and wherein the display device comprises:

a signal voltage application portion that is connected to the plurality of the signal electrodes and applies a signal voltage in the predetermined voltage range between the first voltage and the second voltage to each of the signal electrodes in accordance with information to be displayed on the display surface side;

a reference voltage application portion that is connected to the plurality of the reference electrodes and applies one of a selected voltage and a non-selected voltage to each of the reference electrodes, the selected voltage allowing the conductive liquid to move in the display space in accordance with the signal voltage and the non-selected voltage inhibiting a movement of the conductive liquid in the display space; and a scanning voltage application portion that is connected to the plurality of the scanning electrodes and applies one of a selected voltage and a non-selected voltage to each of the scanning electrodes, the selected voltage allowing the conductive liquid to move in the display space in accordance with the signal voltage and the non-selected voltage inhibiting a movement of the conductive liquid in the display space.

3. The display device according to claim 2, wherein a plurality of pixel regions are provided on the display surface side, the plurality of the pixel regions are located at each of the intersections of the signal electrodes and the scanning electrodes, and the display space in each of the pixel regions is partitioned by a partition.

4. The display device according to claim 3, wherein the plurality of the pixel regions are provided in accordance with a plurality of colors that enable full-color display to be shown on the display surface side.

5. The display device according to claim 1, wherein an insulating fluid that is not mixed with the conductive liquid is movably sealed in the display space.

6. The display device according to claim 1, wherein a dielectric layer is formed on the surfaces of the reference electrode and the scanning electrode.

7. The display device according to claim 1, wherein the first substrate and the second substrate are made of a transparent sheet material, and a backlight is provided on a back of the second substrate.

8. The display device according to claim 1, wherein the first substrate is made of a transparent sheet material, and the second substrate is provided with a light reflection portion.

9. The display device according to claim 1, wherein the first substrate is made of a transparent sheet material, the second substrate is provided with a light reflection portion and a transparent portion that are arranged side by side, and a backlight is provided on a back of the light reflection portion and the transparent portion.

10. The display device according to claim 1, wherein each of the third voltage and the fourth voltage is an intermediate voltage value between the first voltage and the second voltage.

11. The display device according to claim 1, wherein the non-effective display region is defined by a light-shielding layer that is provided on one of the first substrate and the second substrate, and the effective display region is defined by an aperture formed in the light-shielding layer.

12. An electric apparatus comprising a display portion that displays information including characters and images, wherein the display portion comprises the display device according to claim 1.

* * * * *